(12) United States Patent
Nakamura et al.

(10) Patent No.: US 10,454,314 B2
(45) Date of Patent: Oct. 22, 2019

(54) WIRELESS POWER-SUPPLYING SYSTEM

(71) Applicant: IHI CORPORATION, Tokyo (JP)

(72) Inventors: Toshio Nakamura, Tokyo (JP); Takahiko Murayama, Tokyo (JP); Jun Araki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 274 days.

(21) Appl. No.: 15/598,291

(22) Filed: May 17, 2017

(65) Prior Publication Data

US 2017/0256993 A1 Sep. 7, 2017

Related U.S. Application Data

(63) Continuation of application No. PCT/JP2015/084785, filed on Dec. 11, 2015.

(30) Foreign Application Priority Data

Feb. 6, 2015 (JP) .................................. 2015-022252

(51) Int. Cl.
*B60L 11/18* (2006.01)
*H02J 50/12* (2016.01)
(Continued)

(52) U.S. Cl.
CPC .............. *H02J 50/12* (2016.02); *B60L 53/12* (2019.02); *H02J 7/025* (2013.01); *H02J 50/80* (2016.02);
(Continued)

(58) Field of Classification Search
USPC ......................................................... 307/104
See application file for complete search history.

(56) References Cited

U.S. PATENT DOCUMENTS

2007/0222426 A1  9/2007  Waffenschmidt et al.
2011/0049995 A1  3/2011  Hashiguchi
(Continued)

FOREIGN PATENT DOCUMENTS

CN    104065179 A    9/2014
EP    2822147 A1    1/2015
(Continued)

OTHER PUBLICATIONS

Liu et al., Circuit Analysis (4th Edition), Xi'an University of Electronic Science and Technology Press, Jan. 31, 2012, pp. 166-171 (with English concise explanation of relevance provided by English translation of Search Report for Chinese Office Action dated Jan. 23, 2019 for the Chinese Patent Application No. 201580061692.3).

(Continued)

*Primary Examiner* — Rexford N Barnie
*Assistant Examiner* — Xuan Ly
(74) *Attorney, Agent, or Firm* — Volpe and Koenig, P.C.

(57) ABSTRACT

A wireless power-supplying system according to the present disclosure includes a power-transmitting device and a power-receiving device. The power-transmitting device includes a power-transmitting coil to which AC power of a certain frequency is input from a power supply and a controller which controls a frequency. The power-receiving device includes a power-receiving coil magnetically coupled with the power-transmitting coil with a certain coupling coefficient and a power-receiving side series element connected to the power-receiving coil in series and having imaginary impedance $jZ_{S2i}$. The imaginary impedance is defined so that impedance when a power-receiving side is seen from the power supply is independent of the coupling coefficient when the frequency and the coupling coefficient are predetermined values. The controller changes the fre- (Continued)

quency according to at least one of power-transmitting status information of the power-transmitting device and power-receiving status information of the power-receiving device when the coupling coefficient changes.

19 Claims, 10 Drawing Sheets

(51) Int. Cl.
*H02J 50/80* (2016.01)
*H02J 50/90* (2016.01)
*H02J 7/02* (2016.01)
*B60L 53/12* (2019.01)
*B60L 5/00* (2006.01)
*B60M 7/00* (2006.01)

(52) U.S. Cl.
CPC ............... *H02J 50/90* (2016.02); *B60L 5/00* (2013.01); *B60M 7/00* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | |
|---|---|---|
| 2011/0316348 A1 | 12/2011 | Kai et al. |
| 2013/0002034 A1 | 1/2013 | Onizuka et al. |
| 2013/0082538 A1 | 4/2013 | Wambsganss et al. |
| 2013/0088088 A1 | 4/2013 | Wambsganss et al. |
| 2013/0221758 A1* | 8/2013 | Kai .................. H04B 5/0037 307/104 |
| 2015/0051750 A1* | 2/2015 | Kurs .................. G05F 1/625 700/298 |
| 2015/0380944 A1 | 12/2015 | Yu et al. |
| 2016/0064951 A1 | 3/2016 | Yamamoto et al. |
| 2018/0351411 A1 | 12/2018 | Yu et al. |

FOREIGN PATENT DOCUMENTS

| | | |
|---|---|---|
| EP | 2824797 A1 | 1/2015 |
| EP | 3121933 A1 | 1/2017 |
| JP | 2007-538478 A | 12/2007 |
| JP | 2010-233442 A | 10/2010 |
| JP | 2011-050140 A | 3/2011 |
| JP | 2012-130173 A | 7/2012 |
| JP | 2013-243882 A | 12/2013 |
| WO | 2011/033660 A1 | 3/2011 |
| WO | 2012/063570 A1 | 5/2012 |
| WO | 2015/015771 A1 | 2/2015 |
| WO | 2015/170658 A1 | 11/2015 |

OTHER PUBLICATIONS

Chinese Office Action dated Jan. 23, 2019 for the Chinese Patent Application No. 201580061692.3 (with English translation provided for Search Report).

* cited by examiner

WIRELESS POWER-SUPPLYING SYSTEM

CROSS-REFERENCE TO RELATED APPLICATION

This application is a Continuous Application based on International Application No. PCT/JP2015/084785, filed Dec. 11, 2015, which claims priority based on Japanese Patent Application No. 2015-22252, filed Feb. 6, 2015, the contents of which are incorporated herein by reference.

TECHNICAL FIELD

The present disclosure relates to a wireless power-supplying system.

BACKGROUND ART

Wireless power-supplying systems which supply power using electromagnetic induction, magnetic field resonance, or the like from a power-transmitting device including a power-transmitting coil to a power-receiving device including a power-receiving coil have become known in recent years. In this system, magnetic flux generated by the power-transmitting coil is interlinked with the power-receiving coil, and thereby power is transmitted between the coils. Therefore, efficiency of power transmission (transmission efficiency) is affected by a positional relationship between the power-transmitting coil and the power-receiving coil.

As one application of such a wireless power-supplying system, battery charging of an electric vehicle has drawn attention. In this case, the power-receiving device is installed in a vehicle. However, due to a limit in driving accuracy, it is difficult to park the vehicle accurately at a predetermined position for charging. Therefore, the positional relationship between the power-transmitting coil and the power-receiving coil may be different each time the vehicle is parked. When the power-transmitting coil and the power-receiving coil are misaligned from a desired positional relationship, a coupling coefficient between the coils may change and the transmission efficiency may decrease.

In the related art, a technology which suppresses a decrease in charging efficiency when a positional misalignment between the coils occurs has been proposed (for example, refer to Patent Document 1). A power supply device (power-transmitting device) of Patent Document 1 changes a frequency of AC power supplied to a power-transmitting coil from an inverter circuit (power supply) if transmission efficiency decreases due to occurrence of the positional misalignment. The power supply device further improves the charging efficiency by a change in the frequency.

DOCUMENT OF RELATED ART

Patent Document

[Patent Document 1]
Japanese Unexamined Patent Application, First Publication No. 2012-130173

SUMMARY

Technical Problem

As described also in Patent Document 1, impedance when a power-receiving side is seen from an inverter circuit is expressed by a function of a frequency of power supplied to a power-transmitting coil and a coupling coefficient between the power-transmitting and power-receiving coils. For this reason, if the frequency changes when a positional misalignment occurs and the coupling coefficient changes, changes in the coupling coefficient and the frequency lead to a change in the impedance. Due to the change in the impedance, the output AC voltage of an inverter circuit (or an input AC voltage of the corresponding inverter circuit) also changes to supply desired power.

If an output voltage of the inverter circuit increases, for example, it is necessary to use an element with a high withstand voltage as a circuit element (a field effect transistor (FET) or the like serving as a switching element of the inverter circuit) of a power-transmitting device, and this leads to an increase in a size of the element. If an output voltage of the inverter circuit decreases, it is necessary to increase the output current from the inverter circuit to transmit desired power. If the output current increases, Joule heat loss in an element or wiring in which the current flows increases, and thereby charging efficiency decreases.

Therefore, in view of the above problems, the purpose of the present disclosure is to provide a wireless power-supplying system which can suppress a variation in impedance when a power-receiving side is seen from a power supply when the coupling coefficient changes.

Solution to Problem

According to a first aspect of a wireless power-supplying system of the present disclosure, there is a wireless power-supplying system including a power-transmitting device and a power-receiving device, in which the power-transmitting device includes a power-transmitting coil to which AC power of a certain frequency is input from a power supply and a controller which controls the frequency, the power-receiving device includes a power-receiving coil which is magnetically coupled with the power-transmitting coil with a certain coupling coefficient, and a power-receiving side series element connected to the power-receiving coil in series and having imaginary impedance $jZ_{S2i}$, the imaginary impedance is defined so that impedance when seeing a power-receiving side from the power supply is independent of the coupling coefficient when the frequency and the coupling coefficient are predetermined values, and when the coupling coefficient is changed, the controller changes the frequency according to at least one of power-transmitting status information of the power-transmitting device and power-receiving status information of the power-receiving device.

Effects

According to the present disclosure, when a coupling coefficient changes, it is possible to suppress a variation in impedance when a power-receiving side is seen from a power supply.

DESCRIPTION OF EMBODIMENTS

Figure 1:
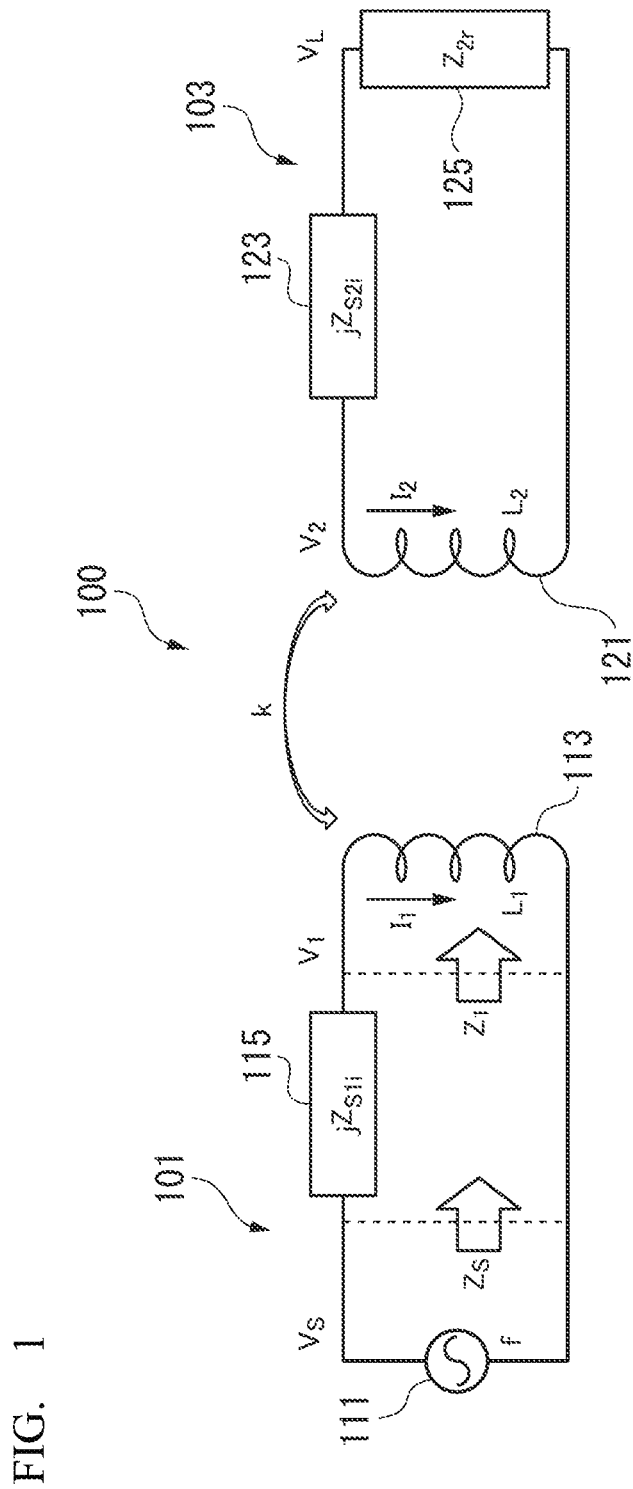
FIG. 1 is a circuit diagram of a wireless power-supplying system according to a first embodiment of the present disclosure.

A wireless power-supplying system according to an aspect of the present disclosure includes a power-transmitting device and a power-receiving device, in which the power-transmitting device includes a power-transmitting coil to which AC power of a certain frequency is input from a power supply and a controller which controls the frequency, the power-receiving device includes a power-receiving coil which is magnetically coupled with the power-transmitting coil with a certain coupling coefficient and a power-receiving side series element connected to the power-receiving coil in series and has imaginary impedance $jZ_{S2i}$, the imaginary impedance is defined so that impedance when a power-receiving side is seen from the power supply is independent of the coupling coefficient when the frequency and the coupling coefficient are predetermined values, and the controller changes the frequency according to at least one of power-transmitting status information of the power-transmitting device and power-receiving status information of the power-receiving device when the coupling coefficient changes.

According to some aspects, a fixed load is connected to the power-receiving device as a power-supply target, the power-transmitting status information is a current $I_1$ flowing in the power-transmitting coil, the power-receiving status information is a current $I_2$ flowing in the power-receiving coil, and the controller changes the frequency so that Equation 1 is satisfied

[Math. 1]

$$\left|\frac{I_2}{I_1}\right| = \sqrt{\frac{L_1}{L_2}} \qquad \text{Equation (1)}$$

(where $L_1$ is self-inductance of the power-transmitting coil and $L_2$ is self-inductance of the power-receiving coil).

According to some aspects, a fixed load is connected to the power-receiving device as a power-supply target, the power-transmitting status information is a voltage $V_1$ across the power-transmitting coil, the power-receiving status information is a voltage $V_2$ across the power-receiving coil, and the controller changes the frequency so that Equation 2 is satisfied

[Math. 2]

$$\left|\frac{V_2}{V_1}\right| = \sqrt{\frac{L_2}{L_1}} \qquad \text{Equation (2)}$$

(where $L_1$ is self-inductance of the power-transmitting coil and $L_2$ is self-inductance of the power-receiving coil).

According to some aspects, a load is connected to the power-receiving device as a power-supply target, the power-receiving status information is load information which is one of power, a current, and a voltage input to the load, and the controller changes the frequency so that the load information approaches a desired value.

According to some aspects, the load is a variable load.

According to some aspects, impedance of at least one of the power-transmitting coil, the power-receiving coil, and the power-receiving side series element changes.

According to some aspects, the controller further controls a magnitude of a voltage output from the power supply and changes the magnitude so that the load information approaches the desired value.

According to some aspects, the power-transmitting status information is a phase difference of a voltage with respect to a current output from the power supply, and the controller changes the magnitude if the phase difference is less than a threshold value due to a change in the frequency.

According to some aspects, the controller further changes the frequency if the phase difference is equal to or greater than the threshold value due to a change in the magnitude.

According to some aspects, there is a maximum value of the magnitude, and the controller changes the frequency when the magnitude reaches the maximum value due to control in the magnitude.

Hereinafter, embodiments of the present disclosure will be described with reference to drawings.

First Embodiment

FIG. 1 is a circuit diagram of a wireless power-supplying system according to a first embodiment of the present disclosure. A wireless power-supplying system 100 includes a power-transmitting device 101 and a power-receiving device 103. The power-transmitting device 101 includes a power-transmitting coil 113 to be described below, and the power-receiving device 103 includes a power-receiving coil 121 to be described below. The power-transmitting device 101 transmits power to the power-receiving device 103 in a non-contact manner through magnetic coupling between the coils. A method of transmitting power using the magnetic coupling between the coils is, for example, an electromagnetic induction method or a magnetic field resonance method. As an application example of the wireless power-supplying system 100, there is, for example, a charging system or a drive system of a movable body such as an electric automobile (vehicle) or an autonomous underwater vehicle, a home appliance, or medical equipment. The power-transmitting coil 113 and the power-receiving coil 121 are, for example, solenoid-type or circular-type coils. The solenoid type is a form in which a conducting wire forming a coil is wound in a three-dimensional spatially spiral shape. The circular type is a form in which the conducting wire forming a coil is wound in a planar swirl shape.

The power-transmitting device 101 includes the power-transmitting coil 113 to which AC power is input from a power supply 111 outputting AC power of a certain frequency f, and an element (power-transmitting side serial element) 115 having imaginary impedance. That is, the power-transmitting coil 113 is configured to receive the AC power of a certain frequency f from the power supply 111. The AC power of a certain frequency f means a frequency of an AC voltage or an alternating current output from the power supply 111 is f. The element 115 is connected to the power supply 111 and the power-transmitting coil 113 in series. Self-inductance of the power-transmitting coil 113 is set as $L_1$, and a current $I_1$ (phasor current) flows in the power-transmitting coil 113. The absolute value of a phasor-displayed current may be an RMS value or a crest value.

The power supply 111 is, for example, a power supply circuit such as an inverter circuit or an AC power supply such as a commercial power supply, and outputs an AC voltage (hereinafter referred to as a power supply voltage) $V_S$ (phasor voltage) of the frequency f (angular frequency $\omega$). The AC power supplied by the power supply 111 is received by the power-transmitting coil 113 through the element 115. The inverter circuit can be realized in a conventionally known method such as a half bridge method or a full bridge method. An absolute value of a phasor-displayed voltage may be the RMS value or the crest value.

When the power supply 111 is realized by the inverter circuit, the inverter circuit includes a plurality of switching elements (electric field effect transistor and the like), and these elements are switched at a switching frequency f, and thereby the AC power of a frequency f is output. That is, the switching frequency is controlled to change the frequency of an output from the inverter circuit. According to a method of the inverter circuit, an alternating frequency output from the inverter circuit may not match the switching frequency in some cases. In addition, direct current power is input to the inverter circuit, but the direct current power is, for example, power supplied from a direct current (DC) power supply or power obtained by converting the AC power into the direct current power by a power conversion circuit. The power conversion circuit includes, for example, a rectifier circuit, and selectively has a power factor correction (PFC: power factor improvement) function or a voltage conversion function. The voltage conversion function is realized by, for example, a non-insulated DC-DC converter using a chopper circuit or an insulated DC-DC converter using a transformer and the like.

The element 115 is realized by, for example, a reactance element such as an inductor (reactor, coil) or a capacitor, or combinations of a plurality of these elements, and imaginary impedance of the element 115 is set as $jZ_{S1i}$ (j: imaginary number unit, $Z_{S1i}$: imaginary portion). The imaginary portion is a real number. When the element 115 is configured by a plurality of elements, for example, one element can be provided between one end of the power supply 111 and the coil 113 (in one connection line between the power supply 111 and the coil 113 in FIG. 1), and one element can be provided between the other end of the power supply 111 and the coil 113 (in the other connection line between the power supply 111 and the coil 113 in FIG. 1). In this case, impedance of the element 115 is combined impedance of these two elements. When the element is a capacitor, the impedance of the element 115 is realized by a plurality of capacitors, and thereby it is possible to reduce a voltage across each of the capacitors. Therefore, a capacitor with a low withstand voltage can be adopted and the power-transmitting device 101 can be decreased in size.

The power-receiving device 103 includes the power-receiving coil 121 which is configured to be magnetically coupled with the power-transmitting coil 113 with a certain coupling coefficient k, and an element (power-receiving side series element) 123 having imaginary impedance. The element 123 is connected to the power-receiving coil 121 in series. In addition, a load 125 having real impedance is connected to the element 123 in series. The load 125 is a power-supply target of the power-receiving device 103. Self-inductance of the power-receiving coil 121 is set as $L_2$, and the current $I_2$ (phasor current) flows in the power-receiving coil 121.

Self-inductance of the power-transmitting coil 113 and the power-receiving coil 121 can vary according to the coupling coefficient k. In this case, there is a change range of self-inductance according to a change in an allowable variation range of the coupling coefficient. Here, the self-inductance of the power-transmitting coil 113 and the power-receiving coil 121 may be set to any value within the change range. In addition, the self-inductance may be set to an average value of values within the change range.

The element 123 is realized by a reactance element such as an inductor (reactor, coil) or a capacitor, or by combinations of a plurality of these elements, and imaginary impedance of the element 123 is set as $jZ_{S2i}$. The load 125 is, for example, a power accumulation device (a lithium-ion secondary battery, a nickel-hydrogen secondary battery, an electric double layer capacitor with large capacity, or the like) which accumulates power or an electric or electronic device which is driven by power, and real impedance of the load 125 is set as $Z_{2r}$. When the element 123 is realized by the plurality of elements, combined impedance of these elements can be configured by imaginary impedance and real impedance. In this case, the imaginary impedance of the combined impedance is set as $jZ_{S2i}$, and a combination of the real impedance of the combined impedance and the real impedance of the load 125 is set as $Z_{2r}$. Moreover, in addition to the reactance element or the secondary batteries, when a power conversion circuit is connected to the power-receiving coil 121, a real portion of the combined impedance of the reactance element, the secondary batteries, and the power conversion circuit configures the real impedance $Z_{2r}$ of the load 125, and an imaginary portion of the combined impedance configures the imaginary impedance $Z_{S2i}$ of the element 123. The power conversion circuit can be realized by a rectifier circuit or various circuits of a combination of the rectifier circuit and a DC-DC converter.

A mutual inductance M of the power-transmitting coil 113 and the power-receiving coil 121 satisfies a relational Equation of $M^2 = k^2 L_1 L_2$, and thus a circuit equation of FIG. 1 is Equation (3).

[Math. 3]

$$\begin{bmatrix} j\omega L_1 + jZ_{S1i} & j\omega k\sqrt{L_1 L_2} \\ j\omega k\sqrt{L_1 L_2} & j\omega L_2 + Z_{2r} + jZ_{S2i} \end{bmatrix} \begin{bmatrix} I_1 \\ I_2 \end{bmatrix} = \begin{bmatrix} V_S \\ 0 \end{bmatrix} \quad \text{Equation (3)}$$

From Equation (3), a relational Equation between $I_1$ and $I_2$ is obtained as Equation (4).

[Math. 4]

$$\frac{I_2}{I_1} = -\frac{j\omega k \sqrt{L_1 L_2}}{Z_{2r} + j(\omega L_2 + Z_{S2i})} \quad \text{Equation (4)}$$

Here, if Equation (5) is satisfied, Equation (6) is satisfied by Equation (4) and Equation (5). Hereinafter, Equation (5) and a condition corresponding to Equation (5) are referred to as optimal transmission conditions

[Math. 5]

$$\left|\frac{I_2}{I_1}\right| = \sqrt{\frac{L_1}{L_2}} \quad \text{Equation (5)}$$

$$\frac{\omega^2 k^2 L_2^2}{Z_{2r}^2 + (\omega L_2 + Z_{S2i})^2} = 1 \quad \text{Equation (6)}$$

Next, impedance $Z_1$ (impedance including the power-transmitting coil 113) when a power-receiving side is seen from the power-transmitting coil 113 is obtained using Equation (3) and Equation (4) as Equation (7). $V_1$ in the Equation is a voltage across the power-transmitting coil. In addition, description of "impedance when the power-receiving side is seen from a certain configuration element" means "impedance downstream from the configuration element" when a power-transmitting side of the wireless power-supplying system is set as an upstream side and the power-receiving side of the wireless power-supplying system is set as a downstream side (the same applies hereinafter).

[Math. 6]

$$Z_1 = \frac{V_1}{I_1} = j\omega L_1 + j\omega k \sqrt{L_1 L_2} \frac{I_2}{I_1} \quad \text{Equation (7)}$$

$$= \frac{\omega^2 k^2 L_2^2}{Z_{2r}^2 + (\omega L_2 + Z_{S2i})^2} \frac{L_1}{L_2} Z_{2r} -$$

$$j \frac{L_1}{L_2} \left( \frac{\omega^2 k^2 L_2^2}{Z_{2r}^2 + (\omega L_2 + Z_{S2i})^2} Z_{S2i} + \left( \frac{\omega^2 k^2 L_2^2}{Z_{2r}^2 + (\omega L_2 + Z_{S2i})^2} - 1 \right) \omega L_2 \right)$$

Here, if each parameter (impedance, a frequency, a coupling coefficient of an element) of the wireless power-supplying system 100 is defined or controlled to satisfy Equation (5), Equation (7) is substituted with Equation (6) to yield Equation (8).

[Math. 7]

$$Z_1 = \frac{L_1}{L_2}(Z_{2r} - jZ_{S2i}) \quad \text{Equation (8)}$$

Therefore, impedance $Z_S$ when a power-receiving side is seen from the power supply 111 (impedance not including the power supply 111) is obtained according to Equation (9).

[Math. 8]

$$Z_S = \frac{L_1}{L_2}\left(Z_{2r} + j\left(\frac{L_2}{L_1} Z_{S1i} - Z_{S2i}\right)\right) \quad \text{Equation (9)}$$

According to Equation (9), the impedance $Z_S$ when the power-receiving side is seen from the power supply 111 is expressed by real impedance $Z_{2r}$ of the load 125 on the power-receiving side and imaginary impedance $jZ_{S1i}$ and $jZ_{S2i}$ of the elements 115 and 123, and does not include the coupling coefficient k. Since the real impedance $Z_{2r}$ and the imaginary impedance $jZ_{S1i}$ and $jZ_{S2i}$ are not dependent on the coupling coefficient k, the impedance $Z_S$ is not dependent on the coupling coefficient k either. That is, even if the coupling coefficient changes, if the frequency f is selected (defined) to satisfy Equation (5), the impedance $Z_S$ and the power supply voltage $V_S$ ($=Z_S/I_1$) do not vary with the coupling coefficient. If Equation (5) is satisfied, a combination of the frequency f, the coupling coefficient k, and the imaginary impedance $Z_{S2i}$ of the element 123 satisfies Equation (6). In other words, whether Equation (5) is satisfied is not related to the impedance of the element of the power-transmitting device 101. Moreover, a real portion of the impedance $Z_S$ is expressed only by the impedance of the load 125 and the self-inductance of the power-transmitting coil 113 and the power-receiving coil 121, and is not affected by the impedance of the elements 115 and 123.

Figure 2:
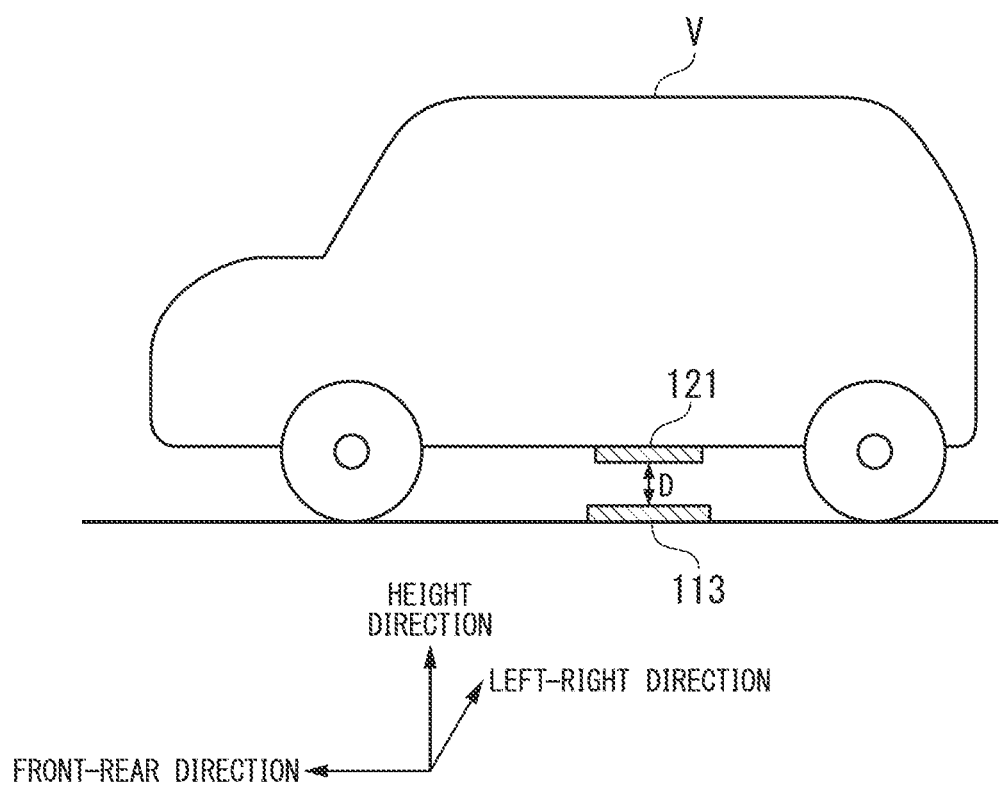
FIG. 2 is a diagram which shows an installation example of a power-transmitting coil and a power-receiving coil of the wireless power-supplying system according to the first embodiment of the present disclosure.

As a situation in which the coupling coefficient k changes, for example, if a relative positional relationship (a positional relationship with respect to a front-rear direction which is a traveling direction of a vehicle V and a left-right direction which is a rotation direction (turning direction) of the vehicle V of FIG. 2) between the power-transmitting coil 113 and the power-receiving coil 121 changes, the coupling coefficient k changes. In addition, if an interval D (a gap distance in a height direction of FIG. 2) between the power-transmitting coil 113 and the power-receiving coil 121 changes, the coupling coefficient k changes. Furthermore, if an orientation or inclination of the power-receiving coil 121 with respect to the power-transmitting coil 113 changes, the coupling coefficient k changes. In this case, a frequency is selected to satisfy Equation (6) with a changed coupling coefficient, and thereby the impedance $Z_S$ is not affected by the changed coupling coefficient and a variation in the power supply voltage $V_S$ can be suppressed. Hereinafter, deviation of the power-transmitting coil 113 or the power-receiving coil 121 from a desired position in at least one direction of the three directions (the front-rear direction, the left-right direction, and the height direction) described above, or deviation of the orientation or inclination of the power-receiving coil 121 with respect to the power-transmitting coil 113 from a desired orientation or inclination is called positional deviation.

Satisfaction of Equation (5) is not limited to satisfaction of a strictly equal relation. For example, an error range is defined in advance based on a measurement error or control error, or an allowable variation range of the power supply voltage $V_S$ defined in advance, or the like, if a difference between a ratio of $I_1$ to $I_2$ and a square root of a ratio of $L_2$ to $L_1$ is in the error range, Equation (5) can be regarded as being satisfied. Alternatively, if the difference is in the error range, the impedance $Z_S$ can be regarded as being independent of the coupling coefficient k.

In addition, in Equation (9), $Z_{S1i}$ satisfies Equation (10), an imaginary portion is canceled and $Z_S$ becomes only a real portion as shown in Equation (11). At this time, a power factor of the power supply 111 is 100[%]. In addition, a value of $Z_{S1i}$ is made to deviate from a value of Equation (10), and thereby it is possible to set the power factor to a desired value without depending on the coupling coefficient k by $Z_S$.

[Math. 9]

$$Z_{S1i} = \frac{L_1}{L_2} Z_{S2i} \quad \text{Equation (10)}$$

$$Z_S = \frac{L_1}{L_2} Z_{2r} \quad \text{Equation (11)}$$

Figure 3:
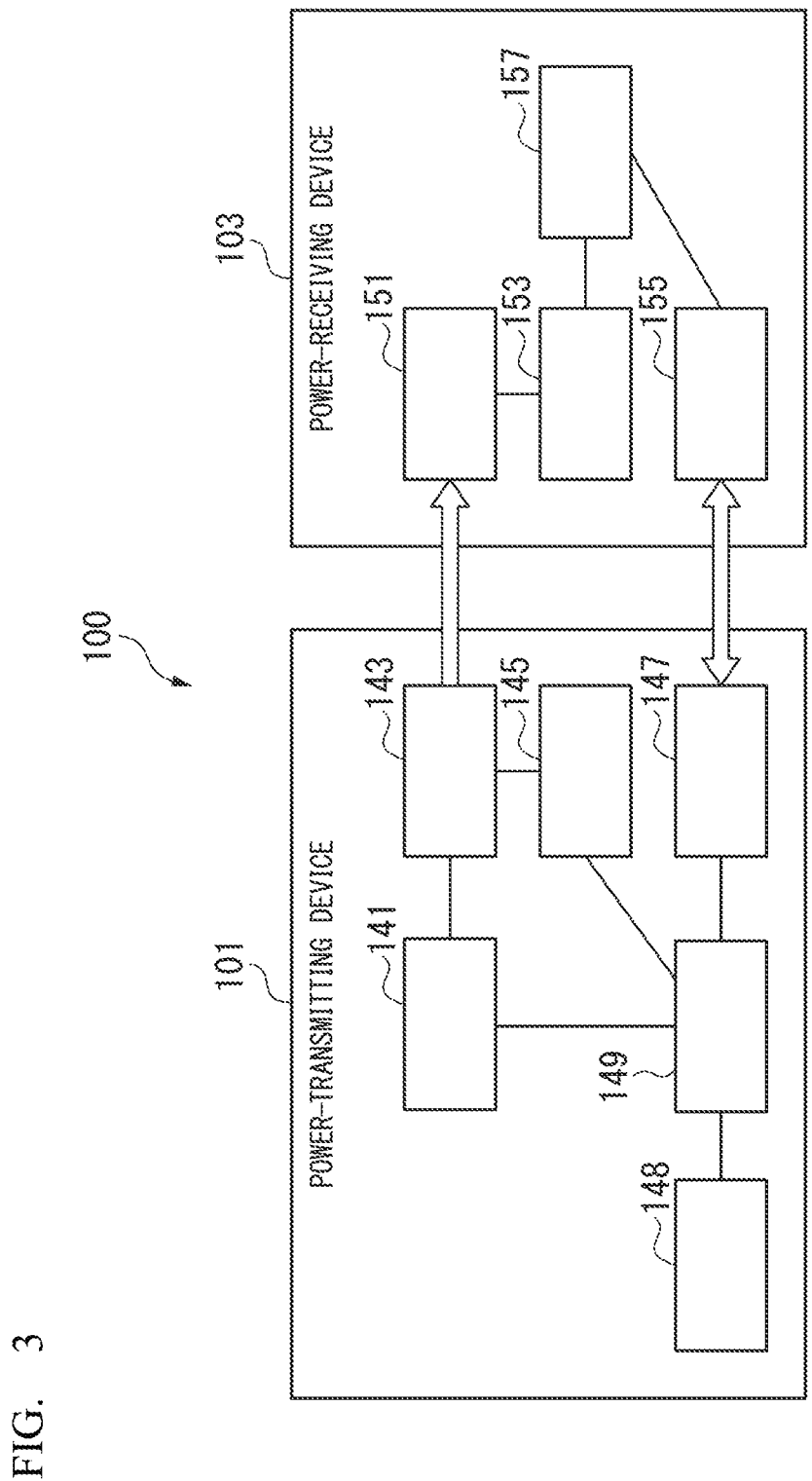
FIG. 3 is a functional block diagram of the wireless power-supplying system according to the first embodiment of the present disclosure.

Next, a specific control method on how a frequency is changed when a coupling coefficient between the coils changes will be described using FIG. 3. FIG. 3 is a functional block diagram of the wireless power-supplying system according to the first embodiment of the present disclosure.

First, functional blocks of the power-transmitting device 101 will be described. The power-transmitting device 101 includes an AC power output unit 141, a power-transmitting unit 143, a power-transmitting side detection unit 145, a power-transmitting side communication unit 147, a storage unit 148, and a power-transmitting side controller 149. The power output unit 141 is connected to the power-transmitting unit 143, the power-transmitting unit 143 is connected to the power-transmitting side detection unit 145, and the power-transmitting side controller 149 is connected to the AC power output unit 141, the power-transmitting side detection unit 145, the power-transmitting side communication unit 147, and the storage unit 148. The AC output unit 141 can also be provided outside the power-transmitting device 101. In addition, a function of each functional block is realized by hardware. Specifically, a function of the power-transmitting unit 143 can be realized by a power transmitter, a function of the power-transmitting side detection unit 145 can be realized by a power-transmitting side detector, a function of the power-transmitting side communication unit 147 can be realized by a power-transmitting side communicator, a function of the storage unit 148 can be realized by a memory, and a function of the power-transmitting side controller 149 can be realized by a power-transmitting side controller.

The AC power output unit 141 corresponds to the power supply 111 of FIG. 1 and outputs AC power. In addition, the power-transmitting unit 143 corresponds to the power-transmitting coil 113 and the element 115 of FIG. 1, and outputs power to a power-receiving unit 151 of the power-receiving device 103 which will be described below.

The power-transmitting side detection unit 145 detects power-transmitting status information of the power-transmitting unit 143, and transmits the detected power-transmitting status information to the power-transmitting side controller 149. The power-transmitting status information is a value of at least one of a current, a voltage, and power of a predetermined place of the power-transmitting device 101. The power-transmitting side detection unit 145 is a current sensor, a voltage sensor, or a power sensor. The power-transmitting status information is, more particularly, for example, a current $I_1$ flowing in the power-transmitting coil 113, a voltage $V_1$ across the power-transmitting coil 113, or a power supply voltage $V_S$ of the AC power output unit 141. As the current sensor, a sensor that measures a magnetic field generated around a wire through which a current passes due to a Hall effect or a sensor which inserts resistance in the wire through which a current passes and measures a potential drop caused by the resistance can be used. As a voltage sensor, there is, for example, a sensor which divides a voltage by resistance and converts the voltage into a digital value using an AD converter. In addition, as a power sensor, there is, for example, a sensor which measures a voltage and a current with a voltage sensor and a current sensor, and obtains power by temporally averaging a value found by multiplying the voltage and the current.

The power-transmitting side communication unit 147 performs wireless communication with a power-receiving side communication unit 155 to be described below. A communication method between the power-transmitting side communication unit 147 and the power-receiving side communication unit 155 is wireless communication using radio waves such as ZigBee® or Bluetooth®, or optical communication using an optical signal. In the case of the communication method using radio waves, the power-transmitting side communication unit 147 has an antenna, and the power-transmitting side communication unit 147 has a light-emitting element or a light-receiving element for communication in the case of the communication method using an optical signal.

The storage unit 148 stores information on a coupling coefficient or various types of information on impedance (values such as $L_1$ and $L_2$) of an element and the like, a program which describes each function of the power-transmitting side controller 149 to be described below, or the like, and is realized in a volatile storage medium such as a random access memory (RAM), or a non-volatile storage medium such as a read only memory (ROM). The information on a coupling coefficient is information required to specify a coupling coefficient of the power-transmitting coil 113 and the power-receiving coil 121, or information on a combination of the coupling coefficient k and the frequency f satisfying Equation (5).

The power-transmitting side controller 149 controls and manages the whole power-transmitting device 101, beginning with each functional block of the power-transmitting device 101. The power-transmitting side controller 149 is realized, for example, by any appropriate processor such as a central processing unit (CPU) or a dedicated processor (for example, a digital signal processor (DSP)) that is specialized for each process. The power-transmitting side controller 149 is configured to change a frequency of the power supply 111 based on at least one of power-transmitting status information of the power-transmitting device 101 and power-receiving status information of the power-receiving device 103 when the coupling coefficient changes. A specific process performed by the power-transmitting side controller 149 will be described below.

Next, a functional block of the power-receiving device 103 will be described. The power-receiving device 103 includes the power-receiving unit 151, a power-receiving side detection unit 153, a power-receiving side communication unit 155, and a power-receiving side controller 157. The power-receiving unit 151 is connected to the power-receiving side detection unit 153, and the power-receiving side detection unit 153 and the power-receiving side communication unit 155 are connected to the power-receiving side controller 157. In addition, a function of each functional block is realized by hardware. Specifically, a function of the power-receiving unit 151 can be realized by a power receiver, a function of the power-receiving side detection unit 153 can be realized by a power-receiving side detector, a function of the power-receiving side communication unit 155 can be realized by a power-receiving side communicator, and a function of the power-receiving side controller 157 can be realized by a power-receiving side controller, respectively. The power-receiving device 103 includes a storage unit for storing a program and the like which describe each function of the power-receiving side controller 157 in the same manner as the power-transmitting device 101, but illustration thereof will be omitted.

The power-receiving unit 151 corresponds to the power-receiving coil 121 and the element 123 of FIG. 1, receives power from the power-transmitting unit 143, and supplies the power to the load 125.

The power-receiving side detection unit 153 detects power-receiving status information of the power-receiving unit 151, and transmits the detected power-receiving status information to the power-receiving side controller 157. The power receiving status information is a value of at least one of a current, a voltage, and power of a predetermined place of the power-receiving device 103, and the power-receiving side detection unit 153 is a current sensor, a voltage sensor, or a power sensor. The power-receiving status information is, more specifically, for example, a current $I_2$ flowing in the power-receiving coil 121, a voltage $V_2$ across the power-receiving coil 121, or a voltage $V_L$ across the load 125. Specific configurations of the current sensor, the voltage sensor, and the power sensor are the same as those of the power-transmitting side detection unit 145.

The power-receiving side communication unit 155 performs wireless communication with the power-transmitting side communication unit 147. In the case of the communication method using radio waves, the power-receiving side communication unit 155 has an antenna, and in the case of the communication method using an optical signal, the power-receiving side communication unit 155 has a light-emitting element or a light-receiving element for communication.

The power-receiving side controller 157 controls and manages the whole power-receiving device 103, beginning with each functional block of the power-receiving device 103. The power-receiving side controller 157 is realized, for example, by any processor such as a CPU or a DSP. A specific process performed by the power-receiving side controller 157 will be described below.

Subsequently, specific control content of the power-transmitting side controller 149 and the power-receiving side controller 157 when the coupling coefficient changes due to a positional deviation will be described. Hereinafter, the imaginary impedance of the element 123 is defined to satisfy Equation (5) when the frequency of the power supply 111 and the coupling coefficient are predetermined values $f_1$ and $k_1$. This $k_1$ is a coupling coefficient when there is no positional deviation. The storage unit 148 stores these values $f_1$ and $k_1$ in association with each other.

<Fixed Load>

Figure 4:
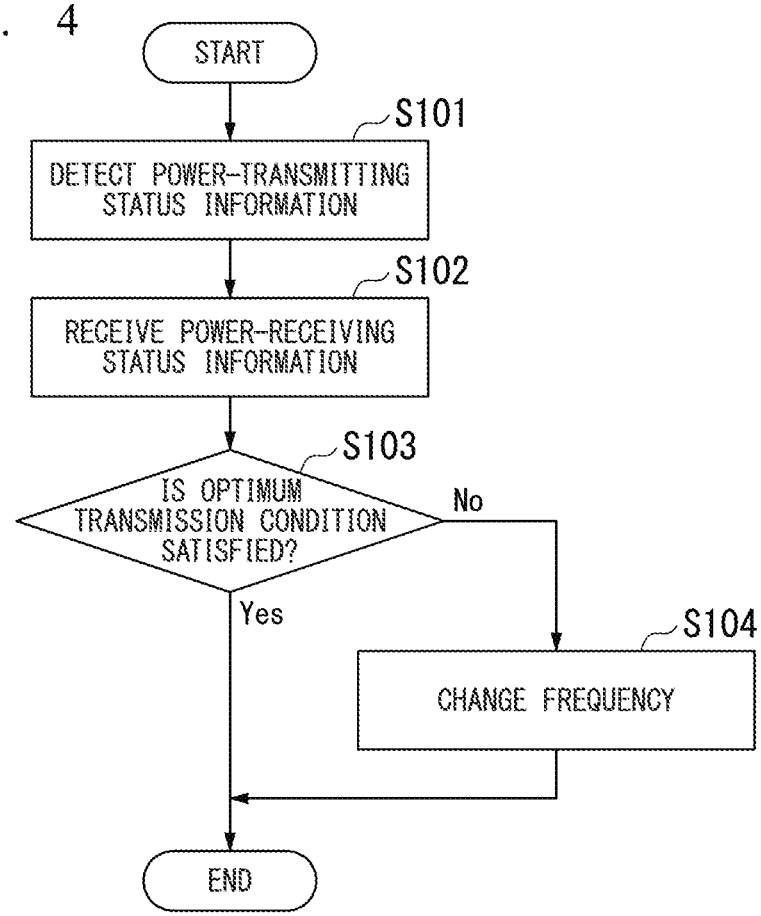
FIG. 4 is a flowchart which shows a process of a power-transmitting device according to the first embodiment of the present disclosure.

First, a case in which the load 125 is a fixed load having constant impedance will be described with reference to FIG. 4. The load 125 is, for example, electric and electronic equipment that is pure resistance.

The power-transmitting side controller 149, on the assumption that a positional deviation does not occur, controls the AC power output unit 141 so that the AC power output unit 141 outputs AC power of the frequency $f_1$ corresponding to no positional deviation. Here, the magnitude of a voltage output from the power supply 111 is a voltage required to input desired power to the load 125 when the frequency and the coupling coefficient are $f_1$ and $k_1$. The power-transmitting unit 143 transmits the AC power to the power-receiving unit 151. Then, the power-transmitting side detection unit 145 detects (step S101) the current $I_1$ flowing in the power-transmitting coil 113 and transmits data of the current to the power-transmitting side controller 149. On the other hand, the power-receiving side detection unit 153 detects the current $I_2$ (power-receiving status information) flowing in the power-receiving coil 121 and transmits data of the current to the power-receiving side controller 157. The power-receiving side controller 157 controls the power-receiving side communication unit 155 so that the power-receiving side communication unit 155 transmits the received current data to the power-transmitting device 101.

Then, the power-transmitting side communication unit 147 receives current data from the power-receiving side communication unit 155 and transmits the current data to the power-transmitting side controller 149 (step S102). The power-transmitting side controller 149 reads values of $L_1$ and $L_2$ stored in the storage unit 148 and determines whether Equation (5) (optimum transmission condition) is satisfied based on the read values of $L_1$ and $L_2$ and the received data of $I_1$ and $I_2$ (step S103).

When Equation (5) is satisfied (Yes in step S103), the power-transmitting side controller 149 determines that the power-transmitting coil and the power-receiving coil are in a desired positional relationship and there is no positional deviation. Then, the power-transmitting side controller 149 controls the power output unit 141 so that the power output unit 141 keeps outputting AC power of $f_1$ without a change in frequency.

When Equation (5) is not satisfied (No in step S103), the power-transmitting side controller 149 determines that a relative positional relationship between the power-transmitting coil and the power-receiving coil deviates from a desired position.

Here, a relationship between the coupling coefficient k and the frequency f which satisfy Equation (5) will be described. Equation (6) is rewritten into Equation (12).

[Math. 10]

$$k^2 = \frac{Z_{2r}^2 + (\omega L_2 + Z_{S2i})^2}{\omega^2 L_2^2} \quad \text{Equation (12)}$$

Figure 5:
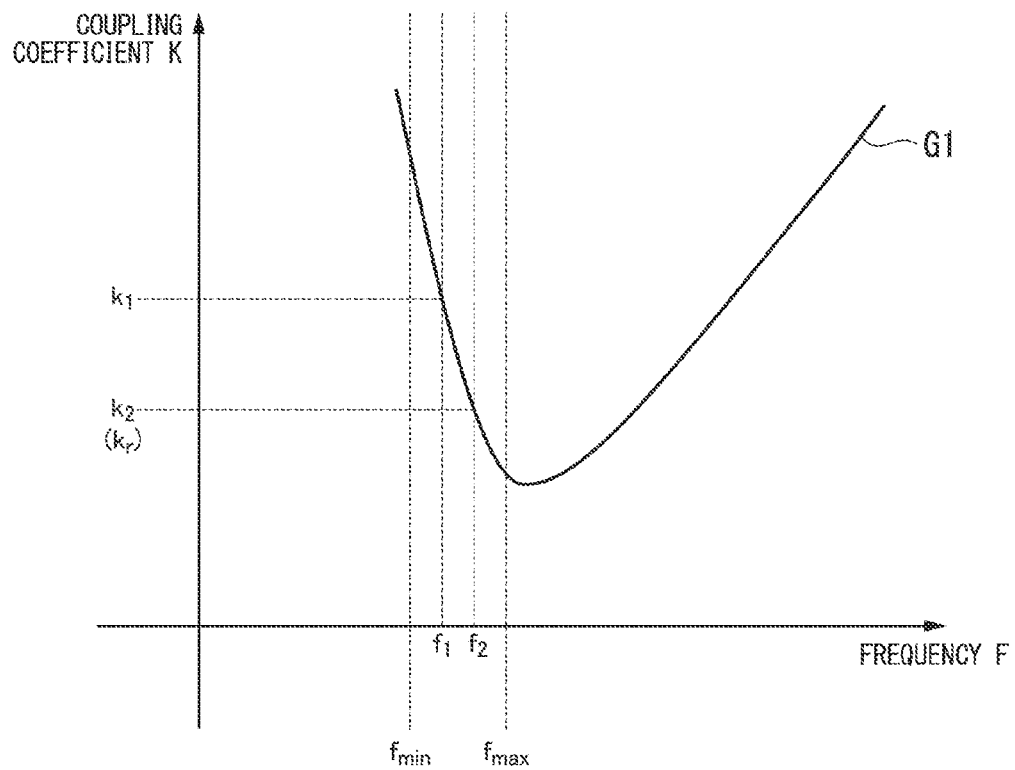
FIG. 5 is a graph which shows an example of a relationship between a frequency and a coupling coefficient according to the first embodiment of the present disclosure.

When the impedance of an element and a load is constant, the coupling coefficient k is a function of an angular frequency ω (that is, the frequency f), and is shown by a graph G1 in a solid line of FIG. 5. As a constraint of the power supply 111 and all the wireless power-supplying system 100, there is (defined) a variable range ($f_{min}$ (lower limit)$\leq f \leq f_{max}$ (upper limit)) of the frequency f, and this variable range is defined with respect to the graph G1 as shown in FIG. 5. The variable range is defined, for example, by upper and lower limits of a frequency range of power which can be output by the power supply 111. When the coupling coefficient satisfying Equation (5) monotonically decreases in the variable range of a frequency, it is necessary to decrease the frequency as the positional deviation decreases (that is, as the coupling coefficient increases). When an actual coupling coefficient $k_r$ (hereinafter referred to as an actual coupling coefficient) is smaller than the coupling coefficient $k_1$ corresponding to the frequency $f_1$ which is currently set (hereinafter referred to as a tuning coupling coefficient), Equation (5) can be satisfied by increasing the frequency f to be larger than $f_1$. Conversely, when the actual coupling coefficient $k_r$ is larger than the tuning coupling coefficient $k_1$, Equation (5) can be satisfied by decreasing the frequency f to be smaller than $f_1$. That is, if a magnitude relationship between the tuning coupling coefficient and the actual coupling coefficient is known, it is possible to specify whether to increase or to decrease the frequency.

If the tuning coupling coefficient and the actual coupling coefficient do not match due to a positional deviation, a current flowing in a coil changes. The power-transmitting side controller 149 calculates an amount α of change (α is a value greater or smaller than 1) in a current depending on $I_1$ and $I_2$ which are the detected values, and $L_1$ and $L_2$ which are stored values (refer to Equation (13)).

[Math. 11]

$$\alpha = \left|\frac{I_2}{I_1}\right| \div \sqrt{\frac{L_1}{L_2}} \qquad \text{Equation (13)}$$

When the impedance of the element and the load is constant, the only parameter that changes due to a positional deviation on a right side of Equation (4) is a coupling coefficient. That is, since the amount α of change corresponds to the amount of change in a coupling coefficient, a coupling coefficient $k_2$ (that is, the actual coupling coefficient $k_r$) after the positional deviation is obtained according to Equation (14) $k_2 = \alpha k_1$.

Therefore, the power-transmitting side controller 149 reads a value of $k_1$ stored in the storage unit 148, obtains the coupling coefficient $k_2$ after the positional deviation using Equation (14), and calculates the frequency $f_2$ satisfying Equation (5) when a coupling coefficient is $k_2$ using Equation (6). The power-transmitting side controller 149 controls the AC power output unit 141 so that the AC power output unit 141 outputs AC power of the frequency $f_2$ (step S104). The frequency $f_2$ after the change may be calculated using feedback control (feedback gain is K) as shown in the following Equation (15) without using Equation (6).

$$f_2 = f_1 + K \cdot (\alpha - 1) \qquad \text{Equation (15)}$$

In this case, steps S101 to S104 are repeated until the optimum transmission condition is satisfied.

An example of a specific control method of a frequency change has been described above, and a method of changing a frequency using the voltage $V_1$ across the power-transmitting coil 113 as power-transmitting status information and the voltage $V_2$ across the power-receiving coil 121 as power-receiving status information will be described below as a modification of the specific control method.

A relationship between $I_1$ and $V_1$, and a relationship between $I_2$ and $V_2$ are obtained according to following Equation (16), and thus Equation (5) is rewritten into Equation (17) (optimum transmission condition).

[Math. 12]

$$|V_1| = j\omega L_1 |I_1|, \quad |V_2| = j\omega L_2 |I_2| \qquad \text{Equation (16)}$$

$$\left|\frac{V_2}{V_1}\right| = \sqrt{\frac{L_2}{L_1}} \qquad \text{Equation (17)}$$

The power-transmitting side detection unit 145 detects the voltage $V_1$ (power-transmitting status information) across the power-transmitting coil 113 (step S101), and the power-receiving side detection unit 153 detects the voltage $V_2$ (power-receiving status information) across the power-receiving coil 121 (step S102). Then, the power-transmitting side controller 149 determines whether the detected voltages $V_1$ and $V_2$ satisfy Equation (17) (step S103).

When Equation (17) is not satisfied (No in step S103), the power-transmitting side controller 149 calculates the amount α of change in a voltage as shown in Equation (18). Then, the power-transmitting side controller 149 obtains the coupling coefficient $k_2$ after a positional deviation using Equation (14), and calculates the frequency $f_2$ satisfying Equation (5) when a coupling coefficient is $k_2$ using Equation (6). The power-transmitting side controller 149 controls the AC power output unit 141 so that the AC power output unit 141 outputs AC power of the frequency $f_2$ (step S104).

[Math. 13]

$$\alpha = \left|\frac{V_2}{V_1}\right| \div \sqrt{\frac{L_2}{L_1}} \qquad \text{Equation (18)}$$

Moreover, when Equation (10) is satisfied, Equation (20) is satisfied using Equation (11) and Equation (19).

[Math. 14]

$$|V_S| = |I_1| \times Z_S, \quad |V_L| = |I_2| \times Z_{2r} \qquad \text{Equation (19)}$$

$$\left|\frac{V_L}{V_S}\right| \div \sqrt{\frac{L_2}{L_1}} \qquad \text{Equation (20)}$$

When Equation (10) is not satisfied, as shown in Equation (9), there is an imaginary portion in the impedance $Z_S$ and the power factor of the power supply 111 is less than 100[%], Equation (20) is Equation (21). θ of Equation (21) is the phase difference between the current and the voltage output from the power supply 111.

[Math. 15]

$$\left|\frac{V_L}{V_S \cos\theta}\right| = \sqrt{\frac{L_2}{L_1}} \qquad \text{Equation (21)}$$

Using Equation (20) and Equation (21), the power-transmitting side detection unit 145 detects an output voltage and a voltage-current phase difference of the power supply 111 as power-transmitting status information, the power-receiving side detection unit 153 determines the voltage across the load 125 as power-receiving status information, and the power-transmitting side controller 149 may also change the frequency based on this detected data.

Here, power supplied to the load 125 when a frequency is selected to satisfy Equation (5) or Equation (17) will be described. If a desired value of the power supplied to the load 125 is set as $P_{do}$ (fixed value), a voltage $V_L$ across the load 125 is obtained as in Equation (22).

$$V_L{}^2 = P_{do} \cdot Z_{2r} \qquad \text{Equation (22)}$$

Since the load 125 is a fixed load, $Z_{2r}$ is a fixed value. Therefore, $V_L$ is obtained from Equation (22), and a voltage $V_S$ of the power supply 111 required to supply desired power to the load 125 is defined by Equation (21). Then, when the frequency $f_1$ and the coupling coefficient $k_1$ satisfy Equation (5), a voltage of the power supply 111 is fixed to the voltage $V_S$ required to input the desired power to the load 125. In this state, if a frequency is selected to satisfy Equation (5) or Equation (17), Equation (21) is satisfied. Accordingly, even if the frequency changes, a desired voltage $V_L$ is across the load 125 and the desired power is supplied to the load 125.

A method in which the power-transmitting side controller 149 changes a frequency based on detection results of the power-transmitting side detection unit 145 and the power-receiving side detection unit 153 has been described above, and as a modification of the method, a method in which a frequency change is realized without using the power-transmitting side detection unit 145 will now be described. A functional block diagram is the same as FIG. 3 except that the power-transmitting side detection unit 145 disappears. Hereinafter, differences from the above description will be mainly described, and since functions of the functional units 141, 143, 147, 151, and 155 are the same as described above, a duplicated description will be omitted.

The storage unit 148 stores a relationship between received power and a coupling coefficient in the power-receiving device 103 as information on a coupling coefficient. The relationship is, for example, a relationship between power (supplied power) supplied to the load 125 and a coupling coefficient when the power-transmitting device 101 outputs constant power at a predetermined frequency (since a frequency is fixed when a coupling coefficient is obtained). Hereinafter, the information on a coupling coefficient is the relationship between received power and a coupling coefficient, but it is not limited to the embodiment. As the information on a coupling coefficient, a parameter correlated with a coupling coefficient can be randomly used. The parameter correlated to a coupling coefficient is, for example, the current $I_2$ of the power-receiving coil 121.

The power-receiving side detection unit 153 is a voltage sensor and current sensor which detects a voltage across the load 125 and a current input to the load 125 as power-receiving status information. The detection place is not limited to the load 125, and the power-receiving side detection unit 153 may measure the voltage and the current related to the element 123. In addition, the detection target is not limited to voltage or current, and may be power. In this case, the power-receiving side detection unit 153 is a power sensor.

If the power-transmitting device 101 outputs AC power of the frequency $f_1$, the power-receiving unit 151 receives the power, and the power-receiving side detection unit 153 detects a voltage and a current related to the load 125 and transmits the data to the power-receiving side controller 157. The power-receiving side controller 157 calculates a power value charging (consumed by) the load 125 based on the received data. Then, the power-receiving side controller 157 controls the power-receiving side communication unit 155 so that the power-receiving side communication unit 155 transmits the power value data to the power-transmitting device 101.

If the power value data is received through the power-transmitting side communication unit 147, the power-transmitting side controller 149 reads the relationship between received power and a coupling coefficient, which is stored in the storage unit 148, and determines whether the received power value data matches a power value corresponding to the coupling coefficient $k_1$. Matching is not limited to establishment of a strict equation, and the power-transmitting side controller 149 can determine that they match if a difference between the read power value and the received power value is in an error range defined in advance.

When they match, the power-transmitting side controller 149 determines that the power-transmitting coil 113 and the power-receiving coil 121 are in a desired positional relationship and that there is no positional deviation. Then, the power-transmitting side controller 149 controls the AC power output unit 141 so that the AC power output unit 141 keeps outputting AC power of $f_1$ without changing the frequency.

When they do not match, the power-transmitting side controller 149 determines that the relative positional relationship between the power-transmitting coil 113 and the power-receiving coil 121 deviates from a desired position, and specifies the coupling coefficient $k_2$ (that is, the actual coupling coefficient $k_r$) corresponding to the received power value data from the relationship stored in the storage unit 148. Then, the power-transmitting side controller 149 calculates a frequency $f_2$ satisfying Equation (5) when a coupling coefficient is $k_2$, and controls the AC power-output unit 141 so that the AC power-output unit 141 outputs AC power of the frequency $f_2$.

<Variable Load>

Figure 6:
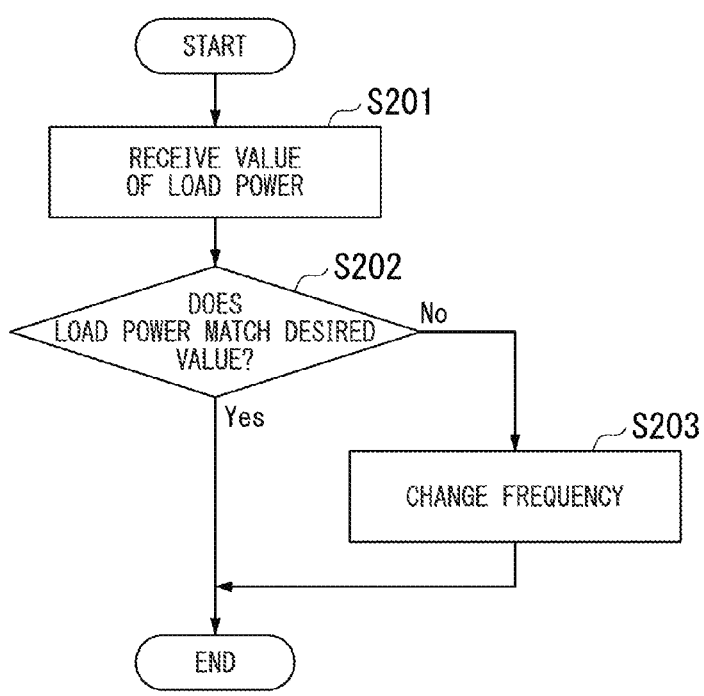
FIG. 6 is a flowchart which shows another process of the power-transmitting device according to the first embodiment of the present disclosure.

Next, a case in which the load 125 is a load with impedance variation will be described with reference to FIG. 6. Such a load 125 is, for example, a power accumulation device, the power accumulation device changes a voltage according to an amount of accumulation, and impedance of the power accumulation device changes according to the voltage (the voltage across the load 125 by the power-receiving device 103) output from the power supply 111. Therefore, even if the power supply voltage $V_S$ is made to be constant like a case in which the load 125 is a fixed load, and a frequency is selected to satisfy Equation (5) or Equation (17), $Z_{2r}$ of Equation (22) varies, and thus the desired power is not input to the load 125.

For this reason, the power-transmitting side controller 149 does not select a frequency to satisfy Equation (5) or Equation (17), and control the frequency of the power supply 111 so that power (load information) to the load 125 approaches a desired value. Hereinafter, the imaginary impedance of the element 123 is defined to satisfy Equation (5) when the frequency and the coupling coefficient of the power supply 111 are $f_1$ and $k_1$ and $Z_{2r}$ is any value in the allowable variation range. In addition, the voltage of the power supply 111 is a value obtained by inputting the desired power to the load 125 when the frequency and the coupling coefficient of the power supply 111 are $f_1$ and $k_1$ and $Z_{2r}$ is a certain value. Load information is not limited to power, and may be a current or a voltage input to the load 125. In this case, the power-transmitting side controller 149 controls the frequency of the power supply 111 so that the current or the voltage input to the load 125 approach desired values.

Specifically, first of all, the power-receiving side detection unit 153 detects power input to the load 125 (hereinafter referred to as load power) as power-receiving status information, and transmits a value (data) of the load power (hereinafter, the value is set as $P_{ro}$) to the power-receiving side controller 157. The power-receiving side controller 157 controls the power-receiving side communication unit 155 so that the power-receiving side communication unit 155 transmits the value of the load power to the power-transmitting device 101.

Then, the power-transmitting side communication unit 147 receives the value of the load power from the power-receiving side communication unit 155, and transmits the value of the load power to the power-transmitting side controller 149 (step S201). The power-transmitting side controller 149 reads a desired value $P_{do}$ stored in advance in the storage unit 148 and compares the load power with the desired value (step S202).

When the load power matches the desired value (Yes in step S202), the power-transmitting side controller 149 controls the AC power output unit 141 so that the AC power output unit 141 keeps outputting AC power of $f_1$ without changing a frequency. This matching is not limited to establishment of a strict equation, and the power-transmitting side controller 149 can determine that the load power matches the desired value if a difference between the load power and the desired value is in the error range defined in advance.

When the load power does not match the desired value (No in step S202), the power-transmitting side controller 149 changes the frequency of the power supply 111 (AC power output unit 141) so that the power input to the load 125 approaches the desired value (step S203). That is, the power-transmitting side controller 149 repeats processes of steps S201 and S202 whenever a frequency is changed. As a change method, for example, the power-transmitting side controller 149 can increase or decrease a frequency by a fixed amount depending on whether the load power is larger or smaller than the desired value.

Figure 7:
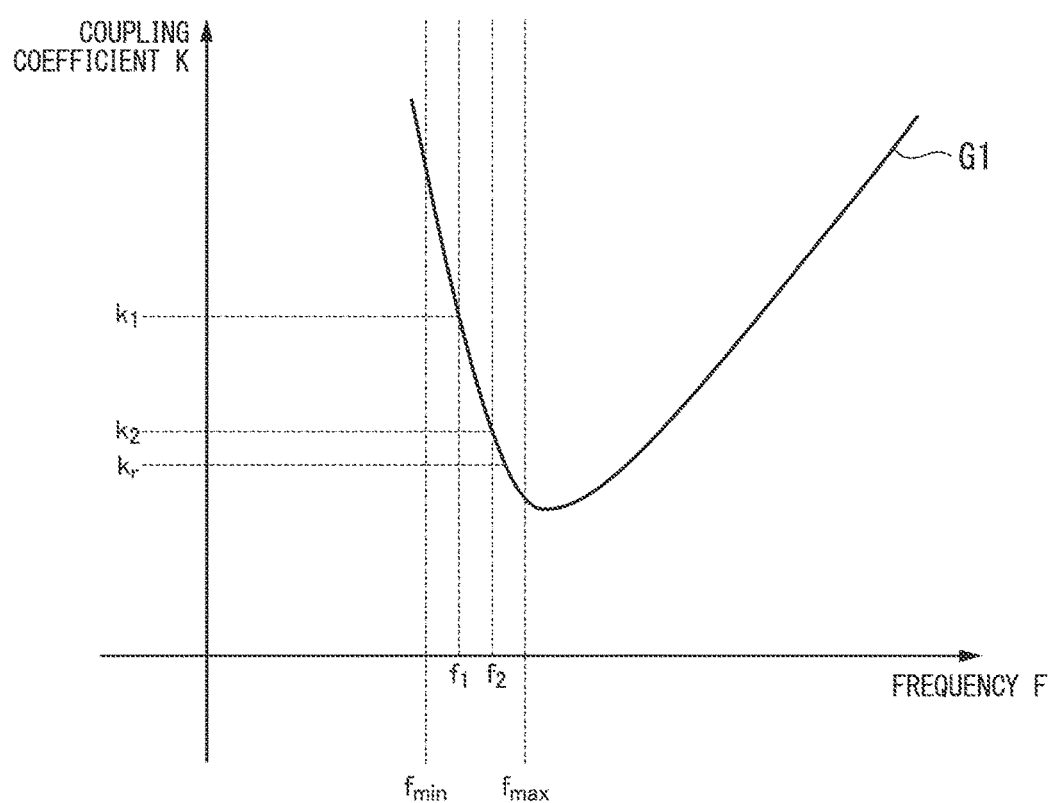
FIG. 7 is a graph which shows another example of the relationship between a frequency and a coupling coefficient according to the first embodiment of the present disclosure.

As shown in FIG. 7, the coupling coefficient satisfying Equation (5) monotonically decreases in the variable range of a frequency. When the actual coupling coefficient $k_2$ is smaller than the tuning coupling coefficient $k_1$ corresponding to the frequency $f_1$ currently set, the load power is larger than the desired value (since a is smaller than in Equation (14) and impedance $Z_1$ is smaller than in Equation (26) to be described below). Accordingly, the power-transmitting side controller 149 increases the frequency by a certain amount when the load power is larger than the desired value. Conversely, when the load power is smaller than the desired value, the power-transmitting side controller 149 can decrease the frequency by a certain amount.

Moreover, the power-transmitting side controller 149 can also change an amount of change in a frequency according to an amount of difference between the load power $P_{ro}$ and the desired value $P_{do}$. For example, the power-transmitting side controller 149 can decide a frequency as shown in Equation (23). $f_1$ is a frequency currently set as a frequency of an output power of the power supply 111, and $f_2$ is a frequency after a change set henceforth as the frequency of output power of the power supply 111. K is an arbitrary gain.

$$f_2 = f_1 + K \cdot (P_{ro} - P_{do}) \quad \text{Equation (23)}$$

Since the impedance of the load 125 varies, when the load power matches the desired value, Equation (5) is not satisfied, but Equation (24) is satisfied.

[Math. 16]

$$\left|\frac{I_2}{I_1}\right| = \alpha \sqrt{\frac{L_1}{L_2}} \quad \text{Equation (24)}$$

In this case, as shown in FIG. 7, there is a deviation between the coupling coefficient $k_2$ satisfying Equation (5) in the frequency $f_2$ (a corresponding angular frequency is set as $\omega_2$) after a change and the actual coupling coefficient $k_r$. That is, as shown in Equation (14), Equation (25) is satisfied.

$$\alpha = k_r / k_2 \quad \text{Equation (25)}$$

When Equation (24) and Equation (25) are satisfied, Equation (7) becomes Equation (26) using Equation (7).

[Math. 17]

$$\begin{aligned} Z_1 &= \frac{V_1}{I_1} \\ &= j\omega_2 L_1 + j\omega_2 k_r \sqrt{L_1 L_2} \\ &= j\omega_2 L_1 + j\omega_2 \alpha k_2 \sqrt{L_1 L_2} \frac{I_2}{I_1} \\ &= \frac{\omega_2^2 \alpha^2 k_2^2 L_2^2}{Z_{2r}^2 + (\omega_2 L_2 + Z_{S2i})^2} \frac{L_1}{L_2} Z_{2r} - j\frac{L_1}{L_2} \\ &\quad \left( \frac{\omega_2^2 \alpha^2 k_2^2 L_2^2}{Z_{2r}^2 + (\omega_2 L_2 + Z_{S2i})^2} Z_{S2i} + \right. \\ &\quad \left. \left( \frac{\omega_2^2 \alpha^2 k_2^2 L_2^2}{Z_{2r}^2 + (\omega_2 L_2 + Z_{S2i})^2} - 1 \right) \omega_2 L_2 \right) \\ &= \alpha^2 \frac{L_1}{L_2} Z_{2r} - j\frac{L_1}{L_2} (\alpha^2 Z_{S2i} + (\alpha^2 - 1)\omega_2 L_2) \end{aligned}$$

Equation (26)

Accordingly, the impedance $Z_S$ is obtained by Equation (27).

[Math. 18]

$$Z_S = \frac{L_1}{L_2}\left( \alpha^2 Z_{2r} + j\left(\frac{L_2}{L_1} Z_{S1i} - \alpha^2 Z_{S2i} + (1 - \alpha^2)\omega_2 L_2\right)\right) \quad \text{Equation (27)}$$

In order for the power input to the load 125 to be the desired value, when an output voltage from the power supply 111 is constant, the impedance $Z_S$ needs to be constant. Because the impedance $Z_{2r}$ of the load 125 varies, α varies due to a change in the frequency and the impedance $Z_S$ is constant. As is apparent from Equation (27), the impedance $Z_S$ is independent of the coupling coefficient.

In addition, when Equation (10) is satisfied, Equation (27) is Equation (28).

[Math. 19]

$$Z_S = \frac{L_1}{L_2}(\alpha^2 Z_{2r} + j(1 - \alpha^2)(Z_{S2i} + \omega_2 L_2)) \quad \text{Equation (28)}$$

As described above, a frequency change when the load 125 is a fixed load or a variable load is described. In this manner, the imaginary impedance $jZ_{S2i}$ of the element 123 is defined so that, when the frequency and the coupling coefficient of the power supply 111 are $f_1$ and $k_1$, the impedance $Z_S$ when the power-receiving side is seen from the power supply 111 is independent of the coupling coefficient, and the load 125 (fixed load) with constant impedance is connected to the power-receiving device 103 in the present embodiment. In this situation, the power-transmitting side controller 149 changes the frequency of the power supply 111 to satisfy Equation (5) based on a current $I_1$ flowing in the power-transmitting coil 113 and a current $I_2$ flowing in the power-receiving coil 121 when the coupling coefficient changes. As long as Equation (5) is satisfied, the impedance $Z_S$ when the power-receiving side is seen from the power supply 111 is constant in Equation (9) and is independent of the coupling coefficient. Accordingly, when the frequency is changed, the impedance $Z_S$ does not change due to a change in the coupling coefficient, and thus it is possible to reduce the variation in the impedance $Z_S$. Then, variation in the power supply voltage $V_S$ may be reduced to an extent that the impedance $Z_S$ does not easily vary. The fact that the AC voltage $V_S$ output from the power supply 111 does not easily vary is because a voltage (for example, the voltage $V_1$ across both ends of the power-transmitting coil 113) on the power-transmitting side, which is correlated with the power supply voltage $V_S$, does not easily vary either. In addition, when the power supply 111 is realized by an inverter circuit, an input AC voltage and an output AC voltage of the inverter circuit are linked, and thus, if the output AC voltage $V_S$ does not easily vary, the input AC voltage does not easily vary either. When the power conversion circuit which outputs the direct current voltage has a chopper circuit, a capacitor is provided at an output end of the power conversion circuit, but a withstand voltage of the capacitor can be reduced by suppressing variation in the direct current voltage output from the power conversion circuit. Therefore, the capacitor and the power-transmitting device 101 can be reduced in size.

In addition, in the embodiment, the power-transmitting side controller 149 changes the frequency of the power supply 111 to satisfy Equation (17) based on the voltage $V_1$ across the power-transmitting coil 113 and the voltage $V_2$ across the power-receiving coil 121 instead of a current of the power-transmitting and power-receiving coils. As long as Equation (17) is satisfied, the impedance $Z_S$ when the power-receiving side is seen from the power supply 111 is constant in Equation (9), and is independent of the coupling coefficient. Accordingly, when the frequency changes, the impedance $Z_S$ does not change due to a change in the coupling coefficient, and thus it is possible to limit the variation in the impedance $Z_S$.

Moreover, in the embodiment, when the load 125 whose impedance is not constant but varies is connected to the power-receiving device 103, the power-transmitting side controller 149 controls the frequency so that the power (load power) input to the load 125 approaches the desired value. Even if Equation (5) and Equation (17) are not satisfied due to a change in the frequency, the impedance $Z_S$ when the power-receiving side is seen from the power supply 111 is only affected by a ratio (rate) $\alpha$ with respect to the coupling coefficient obtained by Equation (25), and the value of the coupling coefficient itself does not affect the impedance $Z_S$, and thus it is possible to limit a variation in the impedance $Z_S$ due to a change in the coupling coefficient. In addition, when the load power matches the desired value, the impedance $Z_S$ is independent of the coupling coefficient, and thus it is possible to further limit the variation in the impedance $Z_S$ due to change in the coupling coefficient.

Second Embodiment

In the first embodiment, a case in which a frequency of the power supply 111 is changed to input the desired power to the load 125 was described, and in a second embodiment, a case in which not only the frequency but also a magnitude (amplitude) of the voltage of the power supply are changed will be described. In the second embodiment, except for a change in the target to be controlled, the configuration of the wireless power-supplying system and functional blocks of the system are the same as in the first embodiment. Therefore, a description will be provided hereinafter using FIG. 1 and FIG. 3 in the second embodiment as well, and a duplicated description will be omitted.

When there is the variable range ($f_{min} \leq f \leq f_{max}$) of the frequency f of the power supply 111, a frequency at which Equation (27) is constant may not be selected in some cases. That is, even if the power (load power) input to the load 125 approaches the desired value, the power may not match the desired value in some cases due to a change in the frequency f of the power supply 111.

Therefore, when the load power is smaller than the desired value, the power-transmitting side controller 149 increases the output voltage of the power supply 111. If the output voltage of the power supply 111 is increased, the current flowing in the wireless power-supplying system 100 increases and the load power increases. Accordingly, the power-transmitting side controller 149 increases the output voltage of the power supply 111 so that the load power approaches the desired value. Conversely, when the load power is larger than the desired value, the power-transmitting side controller 149 decreases the output voltage of the power supply 111.

In addition, as constraints of the power supply 111 or the entire wireless power-supplying system 100, an adjustment range of the output voltage of the power supply 111 may also be limited. For example, a circuit element configuring the power-transmitting device 101 generally has a limit value (withstand voltage) at which it is not damaged, and thus there is (defined) an upper limit value of the output voltage of the power supply 111 from a viewpoint of an element withstand voltage. Accordingly, the power-transmitting side controller 149 can first set the output voltage of the power supply 111 to the upper limit value. When the power input to the load 125 does not reach the desired power, the power-transmitting side controller 149 can change the frequency f of the power supply 111.

Figure 8:
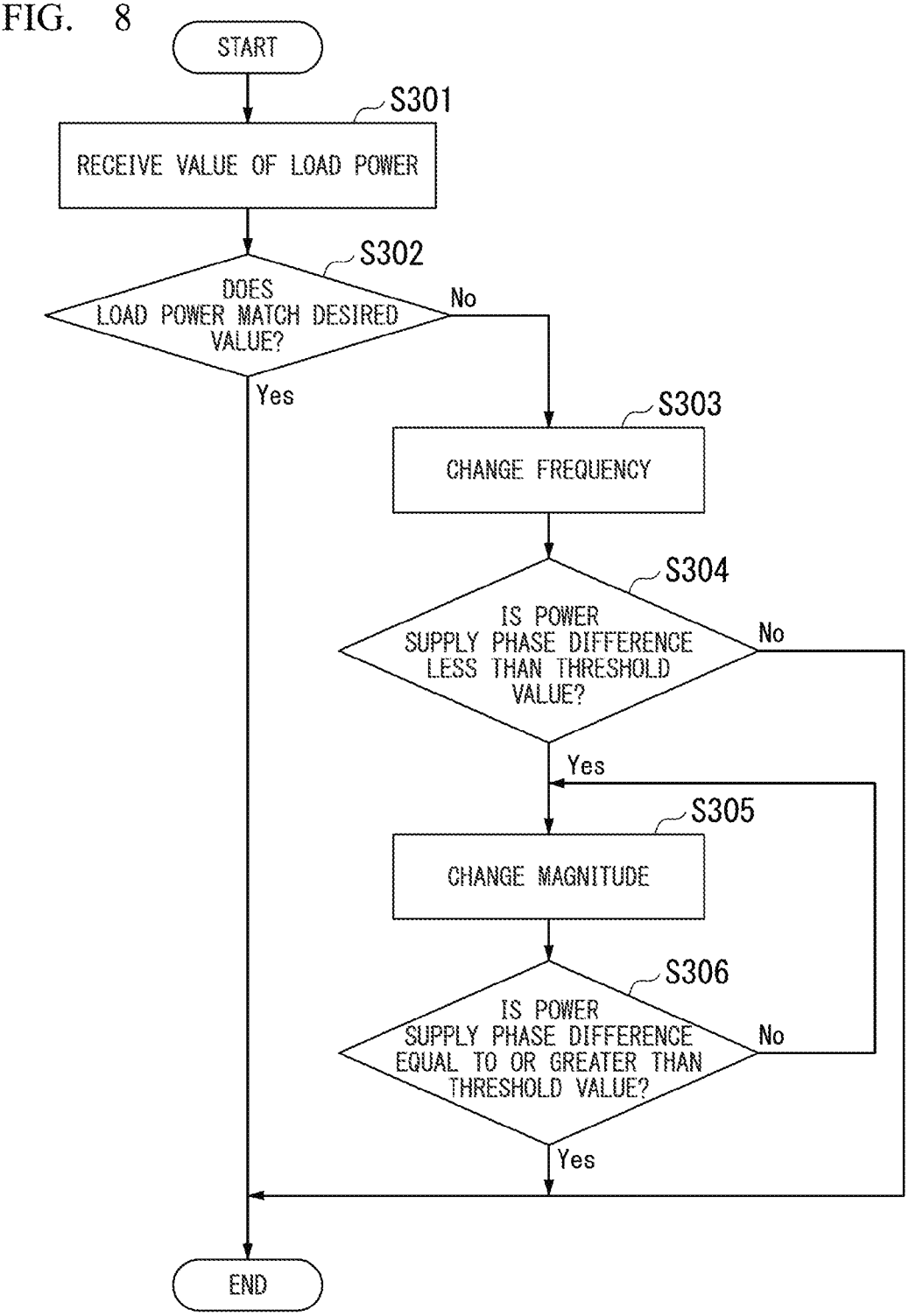
FIG. 8 is a flowchart which shows a process of a power-transmitting device according to a second embodiment of the present disclosure.

Furthermore, another control method will be described using FIG. 8. Here, the power supply 111 is realized by an inverter circuit. In the inverter circuit, direct current power is converted into AC power by switching control of a plurality of switching elements. To limit switching loss in the switching control, a soft switching method is known in the related art. In order for the soft switching method to be realized, it is necessary that a phase difference (hereinafter referred to as power supply phase difference) of a voltage corresponding to a current output from the power supply 111 be equal to or greater than $0[°]$ (that is, that a phase of the voltage be the same as a phase of the current or ahead of the phase of the current). When this phase difference is $0[°]$, the power factor of the power supply 111 is $100[°]$, and power-transmitting efficiency at the power supply 111 can be maximized. However, in reality, there are measurement errors, noise, or the like, and it is difficult to maintain the phase difference at $0[°]$. If the phase of the voltage output from the power supply 111 is delayed even a little from the current (that is, the power supply phase difference is a negative value), the soft switching method is not realized, and thus a threshold value ($>0$) can be set in advance with respect to the power supply phase difference and the power-transmitting side controller 149 can control the magnitudes of the frequency f and the voltage $V_S$ of the power supply 111 so that the power supply phase difference is equal to or greater than the threshold value. The threshold value is stored in the storage unit 148.

First, the power-receiving side detection unit 153 detects the load power and transmits a value of the load power to the power-receiving side controller 157. Then, the power-receiving side controller 157 controls the power-receiving side communication unit 155 so that the power-receiving side communication unit 155 transmits the value of the load power to the power-transmitting device 101.

Then, the power-transmitting side communication unit 147 receives the value of the load power from the power-receiving side communication unit 155 and transmits the value to the power-transmitting side controller 149 (step S301). The power-transmitting side controller 149 determines whether the load power matches the desired value (step S302).

When the desired power is input to the load 125 (Yes in step S302), the power-transmitting side controller 149 does not change the frequency or the voltage of the power supply 111.

When the desired power is not input to the load 125 (No in step S302), the power-transmitting side controller 149 changes the frequency of the power supply 111 (step S303). The power-transmitting side controller 149 can calculate, for example, a value of the frequency after a change using Equation (23).

If the frequency changes, impedance of reactance elements of the element 115 and the element 123 changes. Therefore, a relationship between the current and the voltage output from the power supply 111 also changes, and thus a power supply phase difference also changes. Here, the power-transmitting side controller 149 obtains the power supply phase difference based on a detection result by the power-transmitting side detection unit 145 and compares the power supply phase difference with a threshold value stored in the storage unit 148 (step S304).

When the power supply phase difference is equal to or greater than the threshold value (No in step S304), the power-transmitting side controller 149 can repeat the same processes starting from step S301 until the load power reaches the desired value.

When the power supply phase difference is less than the threshold value (Yes in step S304), the power-transmitting side controller 149 changes the magnitude of the voltage of the power supply 111 (step S305). The voltage of the power supply 111 changes, and thereby the voltage $V_L$ across the load 125 changes. Accordingly, when the load 125 is a variable load, the impedance $Z_{2r}$ of the load 125 changes, and thus the impedance $Z_S$ when the power-receiving side is seen from the power supply 111 changes and the power supply phase difference also changes.

Therefore, the power-transmitting side controller 149 compares the power supply phase difference changed due to a change in the voltage of the power supply 111 with the threshold value (step S306). If the power supply phase difference is equal to or greater than the threshold value (Yes in step S306), the power-transmitting side controller 149 can repeat the same processes starting from step S301, and when the load power does not reach the desired value (No in step S302) even if the frequency and the voltage of the power supply are controlled, the power-transmitting side controller 149 can further change the frequency (step S303).

In this manner, the power-transmitting side controller 149 changes not only the frequency of the power supply 111 but also the magnitude of the AC voltage output from the power supply 111 so that the load power approaches the desired value in the embodiment. Even when there is a variable range of the frequency of the power supply 111, it is possible to more reliably bring the load power close to the desired value.

In addition, in the embodiment, the power-transmitting side controller 149 changes the magnitude of the output voltage of the power supply 111 if the power supply phase difference is less than the threshold value due to a change in the frequency. The power-transmitting side controller 149 changes the output voltage of the power supply 111, and thereby the power supply phase difference increases in some cases. Accordingly, when the power supply 111 is realized by an inverter circuit, a soft switching method is easily realized and switching loss is suppressed. As a result, it is possible to improve power efficiency.

In addition, in the embodiment, if the power supply phase difference is equal to or greater than the threshold value due to a change in the magnitude of the output voltage of the power supply 111, the power-transmitting side controller 149 further changes the frequency. If the power supply phase difference increases due to a change in the output voltage of the power supply 111, it is possible to further change the frequency in a situation in which the soft switching method is maintained. Accordingly, it is possible to more reliably bring the load power close to the desired value while maintaining the soft switching.

Third Embodiment

In the second embodiment, a case in which a magnitude of the voltage of the power supply 111 is changed after the frequency of the power supply 111 is changed was described, and in a third embodiment, a case in which the frequency is changed after the magnitude of the voltage is changed will be described. In the third embodiment, except for a change in a control method, a configuration of the wireless power-supplying system and functional blocks of the system are the same as in the first and second embodiments. Therefore, hereinafter, a description will be provided using FIG. 1 and FIG. 3 in the third embodiment, and a duplicated description will be omitted.

Due to a constraint of the power supply 111 or the wireless power-supplying system 100, there is (defined) a maximum value of a voltage that the power supply 111 can output in some cases. For example, the power supply 111 is realized by an inverter circuit, a power conversion circuit which outputs a direct current voltage may be provided in an input of the inverter circuit. As described in the first embodiment, when a capacitor is provided at an output end of the power conversion circuit, there is a maximum value of the direct current voltage which can be input to the inverter circuit in terms of a withstand voltage of the capacitor. Since the input AC voltage and the output AC voltage of the inverter circuit are linked with each other, there is a maximum value of a voltage that the power supply 111 can output. The output of the power supply 111 is the AC voltage, the maximum value is, for example, an RMS value of the AC voltage or the maximum value of a crest value.

Figure 9:
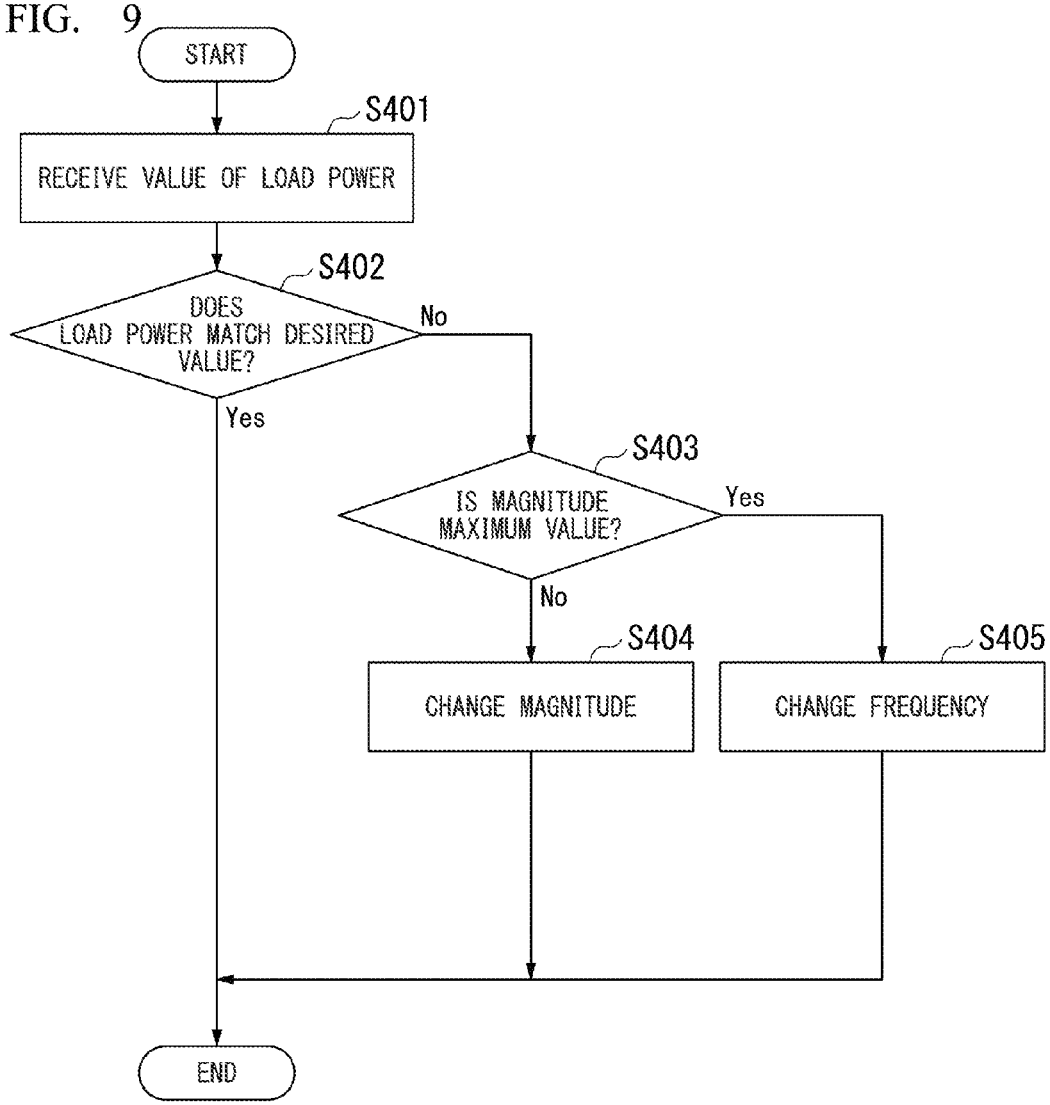
FIG. 9 is a flowchart which shows a process of a power-transmitting device according to a third embodiment of the present disclosure.

A control method of the embodiment will be described using FIG. 9. First, the power-receiving side detection unit 153 detects a load power and transmits a value of the load power to the power-receiving side controller 157. Then, the power-receiving side controller 157 controls the power-receiving side communication unit 155 so that the power-receiving side communication unit 155 transmits the value of the load power to the power-transmitting device 101.

Then, the power-transmitting side communication unit 147 receives the value of the load power from the power-receiving side communication unit 155, and transmits the value to the power-transmitting side controller 149 (step S401). The power-transmitting side controller 149 determines whether the load power matches the desired value (step S402).

When a desired power is input to the load 125 (Yes in step S402), the power-transmitting side controller 149 does not change the frequency or the magnitude of the voltage of the power supply 111.

When the desired power is not input to the load 125 (No in step S402), the power-transmitting side controller 149 determines whether the magnitude of the voltage of the power supply 111 is the maximum value (step S403). When the magnitude of the voltage of the power supply 111 is not the maximum value (No in step S403), the power-transmitting side controller 149 changes the magnitude of the voltage of the power supply 111 so that the load power approaches the desired value (step S404). That is, steps S401 to S404 are repeated until the load power matches the desired value or until the magnitude of the voltage is the maximum value.

For example, when the load power is less than the desired value, the power-transmitting side controller 149 gradually increases the magnitude of the voltage of the power supply 111, and thereby the load power approaches the desired value. However, even if the magnitude of the voltage of the power supply 111 is the maximum value (Yes in step S403), the load power may not reach the desired value in some cases.

In this case, the power-transmitting side controller 149 changes the frequency of the power supply 111 (step S405). The power-transmitting side controller 149 brings the load power closer to the desired value by changing the frequency. In other words, the power-transmitting side controller 149 repeats steps S401, S402, S403, and S405, and gradually changes the frequency to bring the load power closer to the desired value. A change in the frequency can be realized using, for example, Equation (23), in the same manner as in the first embodiment.

In this manner, the power-transmitting side controller 149 changes the frequency of the power supply 111 only when the magnitude of the voltage of the power supply 111 reaches the maximum value. Since the frequency is changed when the voltage of the power supply 111 is the maximum value, the load power is a maximum value of power which can be achieved at a changed frequency. That is, the load power does not increase any more due to a change in the magnitude of the voltage, and thus the power-transmitting side controller 149 increases the load power to approach a desired value due to a change in the frequency. There is no need to sequentially switch control of the magnitude of the voltage of the power supply 111 and control of the frequency of the power supply 111. Since only the control of the frequency is performed after the control of the magnitude of the voltage, a control process of the power-transmitting side controller 149 can be simplified.

The present disclosure is described based on drawings and embodiments, but it should be noted that those skilled in the art can easily make various changes or modifications based on the present disclosure. Therefore, it should be noted that these modifications or corrections fall within a scope of the present disclosure.

A variation of the impedance of the load 125 is described as a case in which Equation (24) is satisfied in the above description of the embodiments of the present disclosure, but the present disclosure is not limited to this aspect. For example, impedance of at least one of the power-transmitting coil 113, the power-receiving coil 121, and the element 123 may change. In particular, inductance $L_1$ and $L_2$ of the power-transmitting coil and the power-receiving coil change due to heat generation of the coils and a relative positional relationship between the power-transmitting and power-receiving coils.

Therefore, a deviation occurs between initial values $L_1$ and $L_2$ measured in advance before power supply and actual values $L_{1r}$ and $L_{2r}$ during the power supply. Therefore, if a wireless power-supplying system is designed using the initial values $L_1$ and $L_2$ so that a relational Equation of Equation (5) is satisfied, an error $\varepsilon$ occurs in a relationship among the actual values $L_{1r}$ and $L_{2r}$ during the power supply and a coil current as shown in Equation (29). That is, the load power is the desired value when not Equation (5) but Equation (29) is satisfied. A change in the inductance $L_1$ and $L_2$ of the power-transmitting coil 113 and the power-receiving coil 121 is mentioned, but even when the impedance $jZ_{S2i}$ of the element 123 changes, the currents $I_1$ and $I_2$ change, and Equation (29) is satisfied.

[Math. 20]

$$\left|\frac{I_2}{I_1}\right| = \sqrt{\frac{L_1}{L_2}} = (1+\varepsilon)\sqrt{\frac{L_{1r}}{L_{2i}}} = \alpha\sqrt{\frac{L_{1r}}{L_{2r}}} \qquad \text{Equation (29)}$$

In addition, in the above description of the embodiments of the present disclosure, it is described that the power-transmitting side controller 149 performs determination on whether the optimum transmission condition is satisfied (step S103), but the present disclosure is not limited to the embodiments. For example, the power-transmitting device 101 transmits power-transmitting status information to the power-receiving device 103, and thereby the power-receiving side controller 157 can determine whether the optimum transmission condition is satisfied.

In addition, in the above description of the embodiments of the present disclosure, it is described that the power-transmitting side controller 149 performs a comparison (steps S202 and S302) between the load power and the desired value, but the present disclosure is not limited to the embodiments. For example, the power-receiving device 103 has a storage unit, and when the storage unit stores the desired value, the power-receiving side controller 157 can compare the load power and the desired value. Then, the power-receiving side controller 157 may control the power-receiving side communication unit 155 so that the power-receiving side communication unit 155 transmits an instruction to change the frequency of the power supply 111 to the power-transmitting device 101 according to the result of the comparison.

Moreover, in the above description of the embodiments of the present disclosure, it is assumed that voltages and currents in the wireless power-supplying system are sine waves, but when these voltages and currents contain not sine waves but a plurality of frequency components, the disclosure may be applied to a fundamental wave component.

In addition, when there is a resistance component in the power-transmitting coil, the power-receiving coil, and each element, the present disclosure may be applied by ignoring the resistance component and considering it as ideal inductance (coil) or capacitance. Furthermore, even when there is a resistance component and a reactance component in wiring in the wireless power-supplying system, the present disclosure may be applied by ignoring these resistance component and reactance component.

Moreover, in the above description of the embodiments of the present disclosure, for example, content indicated by technical concepts such as "equal to or greater than" a threshold value or "less than" a threshold value is not necessarily a strict meaning, and may include cases in which a reference value is included or a case in which a reference value is not included according to a specification of the power-transmitting device. For example, "equal to or greater than" a threshold value is regarded as including not only a case in which a comparison target is equal to or greater than the threshold value but also a case in which the comparison target exceeds the threshold value. Moreover, for example "less than" a threshold value is regarded to include not only a case in which the comparison target is less than the threshold value but also a case in which the comparison target is equal to or less than the threshold value.

In the above description of the embodiments of the present disclosure, a case in which the elements 115 and 123 having imaginary impedance are connected to the power-transmitting coil 113 and the power-receiving coil 121 in series is described, but the present disclosure is not limited to the embodiments. For example, even with the circuit configuration shown in FIG. 10 and FIG. 11, the frequency may be changed by the same control method as in the embodiments of the present disclosure described above.

Figure 10:
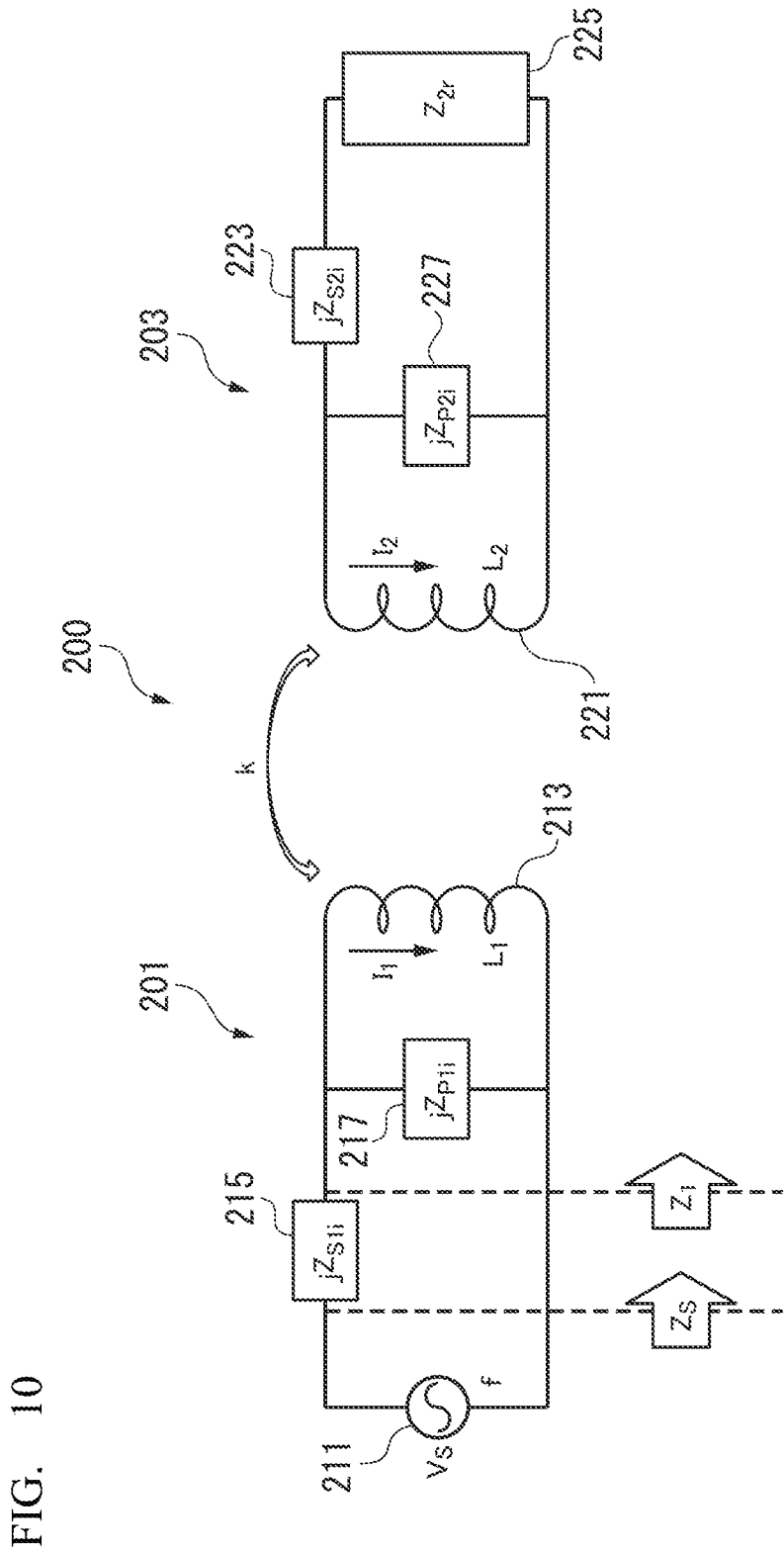
FIG. 10 is a circuit diagram of a wireless power-supplying system according to a modification of the present disclosure.

A wireless power-supplying system 200 of FIG. 10 includes a power-transmitting device 201 and a power-receiving device 203. The power-transmitting device 201 includes a power-transmitting coil 213 to which AC power is input from the power supply 211, an element (power-transmitting side serial element) 215, and an element (power-transmitting side parallel element) 217. The power-receiving device 203 includes a power-receiving coil 221, an element (power-receiving side series element) 223, and an element (power-receiving side parallel element) 227. These configuration elements 211, 213, 215, 221, 223, and 225 are the same as the configuration elements 111, 113, 115, 121, 123, and 125 of the power-transmitting device 101 and the power-receiving device 103, respectively, and thus a duplicated description will be omitted.

The element 217 is connected to the power-transmitting coil 213 in parallel, is connected to a power-transmitting coil side compared to the element 215, and has imaginary impedance of $jZ_{P1i}$. That is, the element 217 is connected to the power-transmitting coil 213 in parallel at a position closer to the power-transmitting coil 213 than the element 215, and has the imaginary impedance of $jZ_{P1i}$. In other words, for this connection relationship, the element 215 is connected to the power-transmitting coil 213 in series and is connected to the power supply side compared to the element 217. In addition, the element 227 is connected to the power-receiving coil 221 in parallel, is connected to the power-receiving coil side compared to the element 223, and has imaginary impedance of $jZ_{P2i}$. That is, the element 227 is connected to the power-receiving coil 221 in parallel at a position closer to the power-receiving coil 221 than the element 223, and has the imaginary impedance of $jZ_{P2i}$. The elements 217 and 227 are realized by, for example, a reactance element such as an inductor (reactor, coil) or a capacitor, or a combination of a plurality of these elements.

Equation (30) is satisfied by setting up the circuit equation of FIG. 10.

[Math. 21]

$$\begin{bmatrix} j\omega L_1 + j\dfrac{Z_{S1i}Z_{P1i}}{Z_{S1i}+Z_{P1i}} & j\omega k\sqrt{L_1 L_2} \\ j\omega k\sqrt{L_1 L_2} & j\omega L_2 + \dfrac{jZ_{P2i}(Z_{2r}+jZ_{S2i})}{Z_{2r}+jZ_{S2i}+jZ_{P2i}} \end{bmatrix} \begin{bmatrix} I_1 \\ I_2 \end{bmatrix} = \begin{bmatrix} \dfrac{Z_{P1i}}{Z_{S1i}+Z_{P1i}}V_S \\ 0 \end{bmatrix} \quad \text{Equation (30)}$$

If each parameter of the wireless power-supplying system 200 is defined or controlled to satisfy Equation (5), the impedance $Z_1$ when the power-receiving side is seen from the element 217 (impedance including the element 217) is obtained as in Equation (31), and does not include the coupling coefficient k.

[Math. 22]

$$Z_1 = \frac{L_1}{L_2} \frac{Z_{P1i}Z_{P2i}(Z_{2r}-jZ_{S2i})}{Z_{P1i}Z_{P2i}+\left(Z_{P1i}-\dfrac{L_1}{L_2}Z_{P2i}\right)(Z_{S2i}+jZ_{2r})} \quad \text{Equation (31)}$$

Here, if impedance values of the power-transmitting side parallel element 217 and the power-receiving side parallel element 227 are defined to satisfy Equation (32), Equation (33) is satisfied by Equation (31) and Equation (32).

[Math. 23]

$$Z_{P1i} = \frac{L_1}{L_2} Z_{P2i} \quad \text{Equation (32)}$$

$$Z_1 = \frac{L_1}{L_2}(Z_{2r}-jZ_{S2i}) \quad \text{Equation (33)}$$

Therefore, the impedance $Z_S$ when the power-receiving side is seen from the power supply 211 (impedance not including the power supply 211) is obtained as in Equation (34).

[Math. 24]

$$Z_S = \frac{L_1}{L_2}\left(Z_{2r}+j\left(\frac{L_2}{L_1}Z_{S1i}-Z_{S2i}\right)\right) \quad \text{Equation (34)}$$

When Equation (5) and Equation (32) are satisfied by Equation (34), the impedance $Z_S$ when the power-receiving side is seen from the power supply 211 is independent of a coupling coefficient and is expressed in the same form as Equation (9) of the embodiments of the present disclosure described above. Accordingly, in the case in which a frequency and a coupling coefficient are certain values, if impedance of the elements 217, 223 and 227 is defined to satisfy Equation (5) and Equation (32), the same frequency change control as in the embodiments of the present disclosure described above may be applied.

Figure 11:
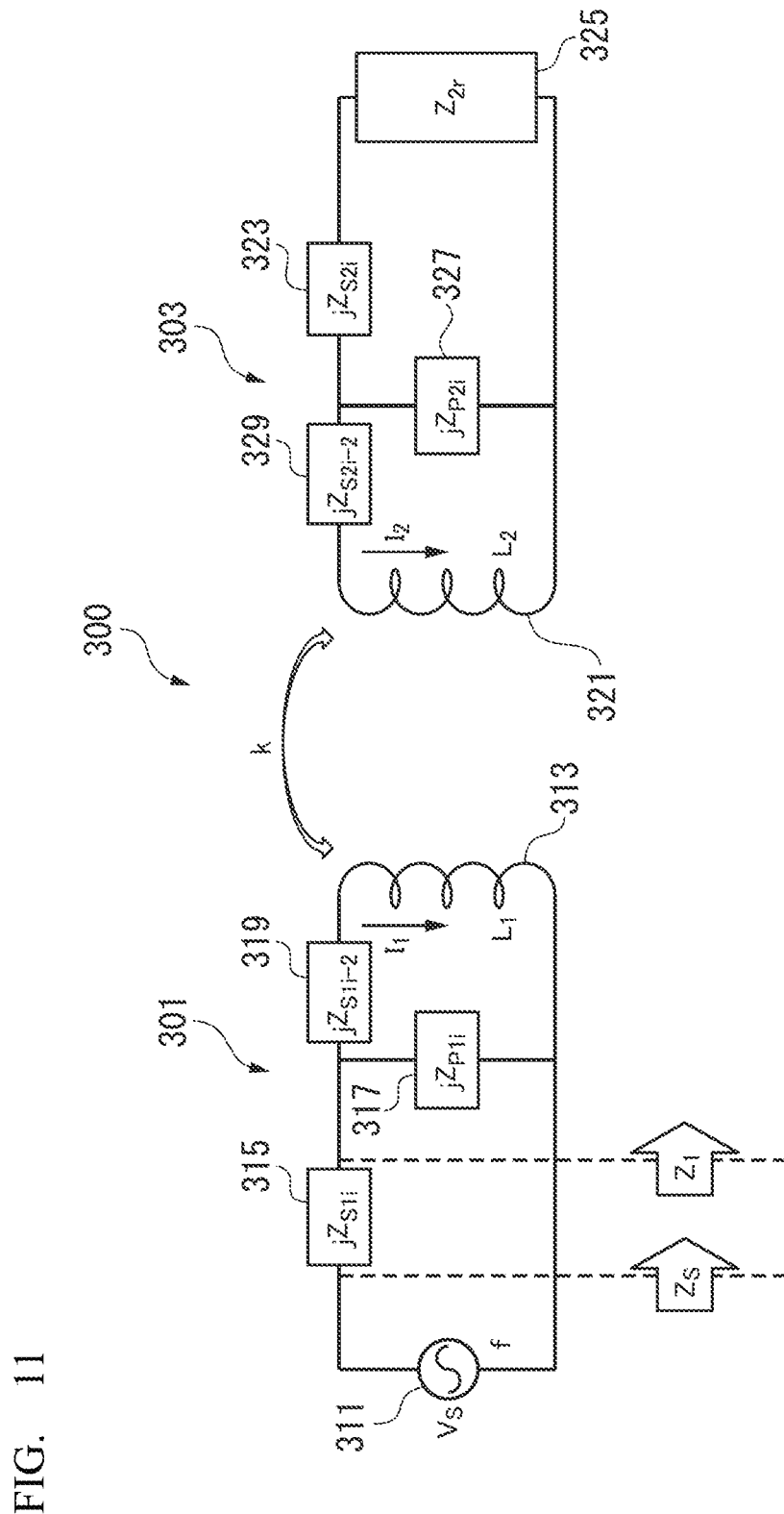
FIG. 11 is a circuit diagram of a wireless power-supplying system according to another modification of the present disclosure.

In addition, the wireless power-supplying system 300 of FIG. 11 includes a power-transmitting device 301 and a power-receiving device 303. The power-transmitting device 301 includes a power-transmitting coil 313 to which AC power is input from the power supply 311, an element 315, an element 317, and an element (power-transmitting side serial element) 319. The power-receiving device 303 includes a power-receiving coil 321, an element 323, an element 327, and an element (power-receiving side series element) 329. These configuration elements 311, 313, 315, 317, 321, 323, 325, and 327 are the same as the configuration elements 211 213, 215, 217, 221, 223, 225, and 227 of the power-transmitting device 201 and the power-receiving device 203, respectively, and thus a duplicated description will be omitted.

The element 319 is connected to the power-transmitting coil 313 in series, is connected to a power-transmitting coil side compared to the element 317, and has imaginary impedance $jZ_{S1i-2}$. That is, the element 319 is connected to the power-transmitting coil 313 in series at a position closer to the power-transmitting coil 313 than the element 317, and has the imaginary impedance $jZ_{S1i-2}$. The element 329 is connected to the power-receiving coil 321 in series, is connected to a power receiving coil side compared to the power-receiving side parallel element 327, and has imaginary impedance $jZ_{S2i-2}$. The element 329 is connected to the power-receiving coil 321 in series at a position closer to the power-receiving coil 321 than the element 327, and has the imaginary impedance $jZ_{S2i-2}$. In the same manner as in FIG. 1 and FIG. 10, when a circuit equation is solved, Equation (5) is satisfied, and when Equation (32) and Equation (35) are satisfied, Equation (9) (or Equation (34)) is satisfied. Accordingly, in the case in which a frequency and a coupling coefficient are certain values, if impedance of the elements 317, 319, 323, 327, and 329 is defined to satisfy Equation (5), Equation (32), and Equation (35), the same frequency change control as in the embodiments of the present disclosure described above may be applied.

[Math. 25]

$$Z_{S1i-2} = \frac{L_1}{L_2} Z_{S2i-2} \qquad \text{Equation (35)}$$

INDUSTRIAL APPLICABILITY

The present disclosure provides a wireless power-supplying system which can, when a coupling coefficient changes, suppress a variation in impedance when a power-receiving side is seen from a power supply.

What is claimed is:
1. A wireless power-supplying system comprising:
a power-transmitting device that includes a power-transmitting coil to which AC power of a certain frequency is input from a power supply;
a controller which controls the frequency;
a power-receiving device that includes:
 a power-receiving coil which is magnetically coupled with the power-transmitting coil with a certain coupling coefficient, and
 a power-receiving side series element connected to the power-receiving coil in series and having an imaginary impedance $jZ_{S2i}$, wherein the imaginary impedance is independent of the coupling coefficient when the frequency and the coupling coefficient are predetermined values, and
a fixed load that is connected to the power-receiving device as a power-supply target,
wherein, in response to the coupling coefficient changing, the controller is configured to change-the frequency according to Equation (1):

$$\left|\frac{I_2}{I_1}\right| = \sqrt{\frac{L_1}{L_2}}$$

where $I_1$ is a current flowing through the power-transmitting coil, $I_2$ is a current flowing through the power-receiving coil, $L_1$ is self-inductance of the power-transmitting coil and $L_2$ is self-inductance of the power-receiving coil.

2. A wireless power-supplying system comprising:
a power-transmitting device that includes a power-transmitting coil to which AC power of a certain frequency is input from a power supply;
a controller which controls the frequency; a power-receiving device that includes:
 a power-receiving coil which is magnetically coupled with the Dower-transmitting coil with a certain coupling coefficient, and
 a power-receiving side series element connected to the power-receiving coil in series and having an imaginary impedance $jZ_{S2i}$ wherein the imaginary impedance is independent of the coupling coefficient when the frequency and the coupling coefficient are predetermined values; and
a fixed load that is connected to the power-receiving device as a power-supply target, and
wherein, in response to the coupling coefficient changing, the controller is configured to change the frequency according to Equation (2):

$$\left|\frac{V_2}{V_1}\right| = \sqrt{\frac{L_2}{L_1}}$$

where $V_1$ is a voltage across the power-transmitting coil, $V_2$ is a voltage across the power-receiving coil, $L_1$ is self-inductance of the power-transmitting coil, and $L_2$ is self-inductance of the power-receiving coil.

3. A wireless power-supplying system comprising:
a power-transmitting device that includes a power-transmitting coil to which AC power of a certain frequency is input from a power supply;
a controller that controls the frequency;
a power-receiving device that includes:
 a power-receiving coil which is magnetically coupled with the power-transmitting coil with a certain coupling coefficient, and
 a power-receiving side series element connected to the power-receiving coil in series and having an imaginary impedance $jZ_{S2i}$, wherein the imaginary impedance satisfies Equation (1) when the frequency and the coupling coefficient are predetermined initial values, wherein Equation (1) is represented by:

$$\left|\frac{I_2}{I_1}\right| = \sqrt{\frac{L_1}{L_2}}$$

where $L_1$ is self-inductance of the power-transmitting coil, $L_2$ is self-inductance of the power-receiving coil, $I_1$ is a current flowing through the power-transmitting coil, and $I_2$ is a current flowing through the power-receiving coil; and
a load that is connected to the power-receiving device as a power-supply target,
wherein, in response to the coupling coefficient changing, the controller is configured to change the frequency so that load information approaches a desired value, wherein the load information includes at least one of power, a current, and a voltage input to the load.

4. The wireless power-supplying system according to claim 3,
wherein the load is a variable load.

5. The wireless power-supplying system according to claim 3,
wherein impedance of at least one of the power-transmitting coil, the power-receiving coil, and the power-receiving side series element is changed changes.

6. The wireless power-supplying system according to claim 4,
wherein impedance of at least one of the power-transmitting coil, the power-receiving coil, and the power-receiving side series element is changed.

7. The wireless power-supplying system according to claim 3,
wherein the controller is further configured to control a magnitude of a voltage output from the power supply and changes the magnitude so that the load information approaches the desired value.

8. The wireless power-supplying system according to claim 4,
wherein the controller is further configured to control a magnitude of a voltage output from the power supply and changes the magnitude so that the load information approaches the desired value.

9. The wireless power-supplying system according to claim 5,
wherein the controller is further configured to control a magnitude of a voltage output from the power supply and changes the magnitude so that the load information approaches the desired value.

10. The wireless power-supplying system according to claim 6,
wherein the controller is further configured to control a magnitude of a voltage output from the power supply and changes the magnitude so that the load information approaches the desired value.

11. The wireless power-supplying system according to claim 7,
wherein the control is further configured to:
determine a phase difference of a voltage with respect to a current output from the power supply, and
on a condition that the phase difference determined is less than a threshold value due to a change in the frequency, change the magnitude.

12. The wireless power-supplying system according to claim 8,
wherein the control is further configured to:
determine a phase difference of a voltage with respect to a current output from the power supply, and
on a condition that the phase difference determined is less than a threshold value due to a change in the frequency, change the magnitude.

13. The wireless power-supplying system according to claim 9,
wherein the control is further configured to:
determine a phase difference of a voltage with respect to a current output from the power supply, and
on a condition that the phase difference determined is less than a threshold value due to a change in the frequency, change the magnitude.

14. The wireless power-supplying system according to claim 10,
wherein the control is further configured to:
determine a phase difference of a voltage with respect to a current output from the power supply, and
on a condition that the phase difference determined is less than a threshold value due to a change in the frequency, change the magnitude.

15. The wireless power-supplying system according to claim 11,
wherein the controller is further configured to change the frequency if the phase difference is equal to or greater than the threshold value due to a change in the magnitude.

16. The wireless power-supplying system according to claim 12,
wherein the controller is further configured to change the frequency if the phase difference is equal to or greater than the threshold value due to a change in the magnitude.

17. The wireless power-supplying system according to claim 13,
wherein the controller is further configured to change the frequency if the phase difference is equal to or greater than the threshold value due to a change in the magnitude.

18. The wireless power-supplying system according to claim 14,
wherein the controller is further configured to change the frequency if the phase difference is equal to or greater than the threshold value due to a change in the magnitude.

19. The wireless power-supplying system according to claim 7,
wherein there is a maximum value of the magnitude, and
the controller is further configured to change the frequency when the magnitude reaches the maximum value due to control of the magnitude.

* * * * *